(12) United States Patent
Kuroda et al.

(10) Patent No.: US 7,772,972 B2
(45) Date of Patent: Aug. 10, 2010

(54) SECURITY MONITORING DEVICE, SECURITY MONITORING SYSTEM AND SECURITY MONITORING METHOD

(75) Inventors: Tekuya Kuroda, Otsu (JP); Toshiro Nakao, Tokyo (JP); Hiroo Kawasaki, Ayabe (JP); Fumihiko Kubo, Kawasaki (JP)

(73) Assignee: Omron Corporation, Kyoto-shi, Kyoto (JP)

( * ) Notice: Subject to any disclaimer, the term of this patent is extended or adjusted under 35 U.S.C. 154(b) by 332 days.

(21) Appl. No.: 11/802,735

(22) Filed: May 24, 2007

(65) Prior Publication Data
US 2007/0273497 A1    Nov. 29, 2007

(30) Foreign Application Priority Data
May 24, 2006   (JP) .............................. 2006-143995

(51) Int. Cl.
*G08B 29/00* (2006.01)
(52) U.S. Cl. .................. 340/506; 340/3.1; 340/825.36; 340/825.49

(58) Field of Classification Search ................. 340/506, 340/3.1, 825.36, 825.49
See application file for complete search history.

(56) References Cited

U.S. PATENT DOCUMENTS 5,400,246 A * 3/1995 Wilson et al. ................. 700/17

FOREIGN PATENT DOCUMENTS

| JP | 2002-24526 A | 1/2002 |
| JP | 2002-352062 A | 12/2002 |

* cited by examiner

*Primary Examiner*—Daryl Pope
(74) *Attorney, Agent, or Firm*—Dickstein Shapiro LLP

(57) ABSTRACT

States of security and risk are accurately recognized and an appropriate measure can be taken. Therefore, in a security monitoring device connected to a security device for securing security of an asset and monitoring the security, information from the security device is monitored and collected in real time on the basis of a set monitoring condition. On the basis of the monitored and collected information, a security risk change is analyzed and estimated, and the analyzed and estimated results are displayed, etc., and outputted.

11 Claims, 15 Drawing Sheets

FIG. 4

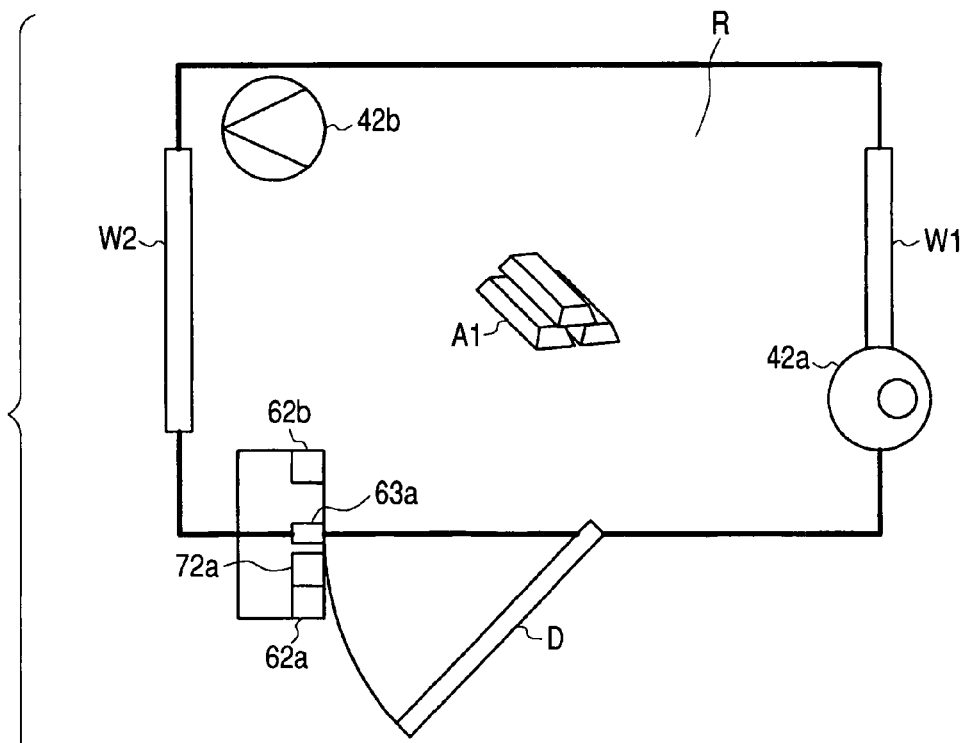

NUMBER OF EMPLOYEES WORKING IN UNDERTAKING OFFICE   1,000 PERSONS
NUMBER OF ENTRY QUALIFIERS INTO ROOM R   100 PERSONS

TOTAL NUMBER OF OPERATION TIMES OF DOOR D   5,000 TIMES/MONTH
NUMBER OF ABNORMAL OPERATION TIMES OF DOOR D   100 TIMES/MONTH

NUMBER OF SECURITY HANDLING MUTUAL AGREEMENTS WITHIN ENTRY QUALIFIERS

GLASS DESTRUCTION DETECTION SENSITIVITY OF WINDOW W1 USING GLASS SENSOR 42a
INVASION DETECTION SENSITIVITY FROM WINDOW W2 USING PASSIVE SENSOR 42b
ID AUTHENTICATING LEVEL OF NON-CONTACT IC CARD
BIOMETRICS PERSONAL AUTHENTICATION   NOT MADE

FIG. 6

| MANAGING CONSTANT | ... | 0.90 | 0.91 | 0.92 | 0.93 | 0.94 | 0.95 | 0.96 | 0.97 | 0.98 | 0.99 | 1.00 |
|---|---|---|---|---|---|---|---|---|---|---|---|---|
| NON-CONTACT IC CARD ID AUTHENTICATION | | | | | LEVEL 1 | | LEVEL 2 | | | | | |
| FINGERPRINT INFORMATION PERSONAL AUTHENTICATION | | | | | | | LEVEL 1 | | LEVEL 2 | | | |
| CARD ID + BIOMETRICS PERSONAL AUTHENTICATION | | | | | | | | | BOTH ARE LEVEL 1 | EITHER IS LEVEL 1 | BOTH ARE LEVEL 2 | |
| GLASS SENSOR | | SENSITIVITY 1 | | | | | SENSITIVITY 2 | | | | | |
| PASSIVE SENSOR | | SENSITIVITY 1 | | | | | SENSITIVITY 2 | | | | | |
| PC LOG-IN MANAGEMENT | | | | | | | USER NAME + PASSWORD COLLATION | | USER ID + PASSWORD COLLATION | | | |
| DB LOG-IN MANAGEMENT | | | | | | | USER NAME + PASSWORD COLLATION | | USER ID + PASSWORD COLLATION | | | |
| NETWORK COMMUNICATION MANAGEMENT | | | | | | | COMMUNICATION DATA ENCRYPTION | | | | | |

FIG. 13

| CLASS | "1" (ONE TIME/ 1,000 YEARS) | "2" (ONE TIME/ 100 YEARS) | "3" (ONE TIME/ 10 YEARS) | "4" (ONE TIME/ ONE YEAR) | "5" (SEVERAL TIMES/ ONE YEAR) |
|---|---|---|---|---|---|
| GENERATION FREQUENCY | 0 OR MORE LESS THAN 0.1 | 0.1 OR MORE LESS THAN 0.3 | 0.3 OR MORE LESS THAN 0.5 | 0.5 OR MORE LESS THAN 0.7 | 0.7 OR MORE LESS THAN 1 |

FIG. 14

| AUTOMATIC MEASURE | · SENSOR SENSITIVITY ADJUSTMENT<br>· AUTHENTICATING LEVEL ADJUSTMENT<br>· AUTHENTICATING CONTENT ADJUSTMENT<br>· ACCESS QUALIFICATION LIMIT<br>· SECURITY DIVISION ADJUSTMENT<br>⋮ |
|---|---|
| MANUAL MEASURE | · OTHER ACCESS QUALIFIER LIMITS<br>· OTHER SECURITY DIVISION ADJUSTMENTS<br>· SECURITY DEVICE ARRANGING INCREASE<br>· SECURITY DEVICE REPAIR-EXCHANGE<br>· ASSET MOVEMENT<br>⋮<br>· MEASURE CONSIDERATION REQUEST |

FIG. 15

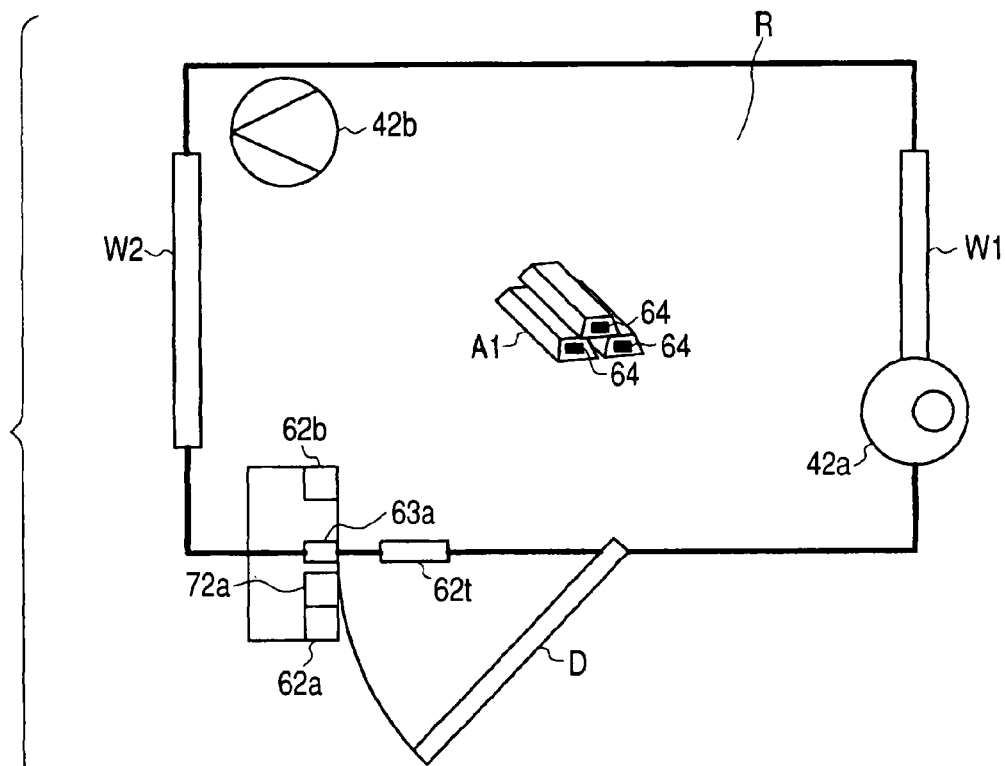

NUMBER OF EMPLOYEES WORKING IN UNDERTAKING OFFICE   1,000 PERSONS
NUMBER OF ENTRY QUALIFIERS INTO ROOM R   100 PERSONS

TOTAL NUMBER OF OPERATION TIMES OF DOOR D   5,000 TIMES/MONTH
NUMBER OF ABNORMAL OPERATION TIMES OF DOOR D   100 TIMES/MONTH

NUMBER OF SECURITY HANDLING MUTUAL AGREEMENTS WITHIN ENTRY QUALIFIERS

GLASS DESTRUCTION DETECTION SENSITIVITY OF WINDOW W1 USING GLASS SENSOR 42a
INVASION DETECTION SENSITIVITY FROM WINDOW W2 USING PASSIVE SENSOR 42b
ID AUTHENTICATING LEVEL OF NON-CONTACT IC CARD
BIOMETRICS PERSONAL AUTHENTICATION   NOT MADE

MOVING MANAGEMENT OF OBJECT ASSET A1 USING RFID ID TAG 64

FIG. 16

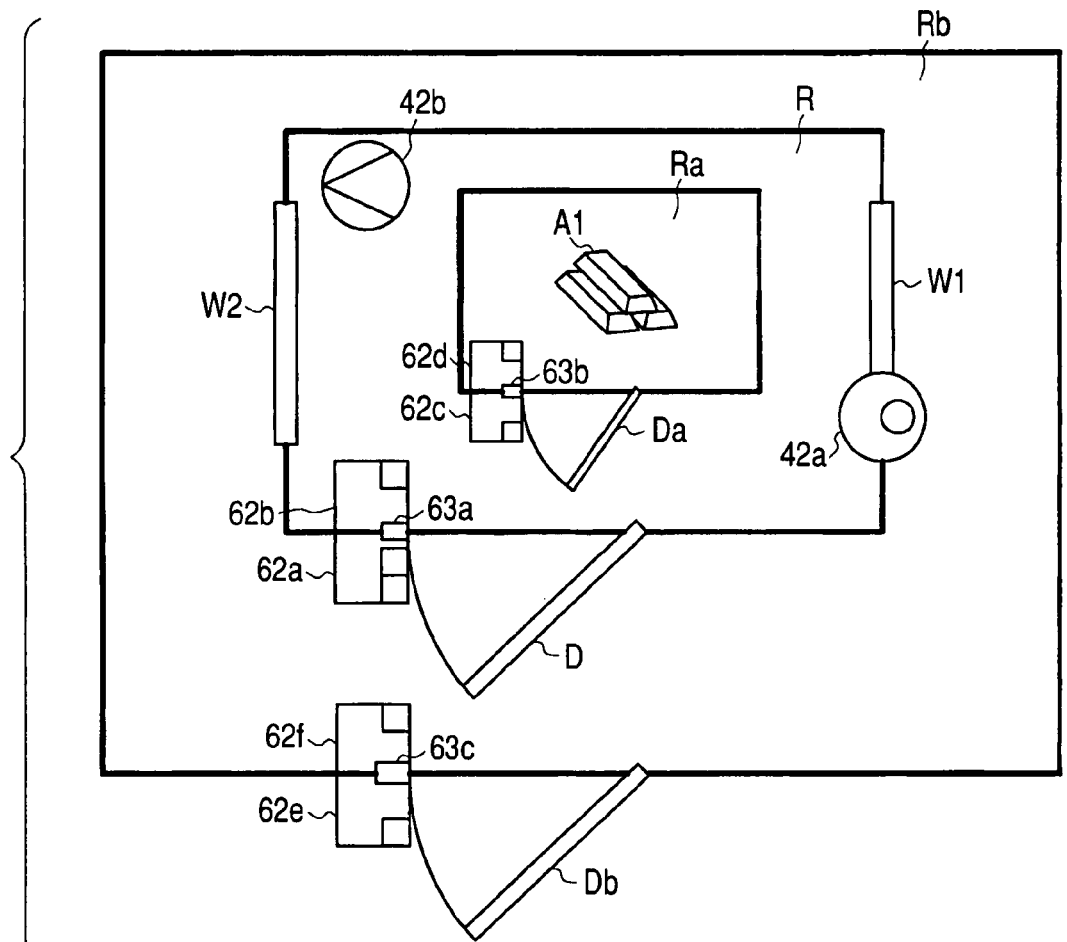

NUMBER OF EMPLOYEES WORKING IN UNDERTAKING OFFICE  1,000 PERSONS
NUMBER OF ENTRY QUALIFIERS INTO ROOM R  100 PERSONS

TOTAL NUMBER OF OPERATION TIMES OF EACH DOOR D  5,000 TIMES/MONTH
NUMBER OF ABNORMAL OPERATION TIMES OF EACH DOOR D  100 TIMES/MONTH

NUMBER OF SECURITY HANDLING MUTUAL AGREEMENTS WITHIN ENTRY QUALIFIERS

GLASS DESTRUCTION DETECTION SENSITIVITY OF WINDOW W1 USING GLASS SENSOR 42a
INVASION DETECTION SENSITIVITY FROM WINDOW W2 USING PASSIVE SENSOR 42b
ID AUTHENTICATING LEVEL OF NON-CONTACT IC CARD OF EACH ROOM
BIOMETRICS PERSONAL AUTHENTICATION  NOT MADE

FIG. 17

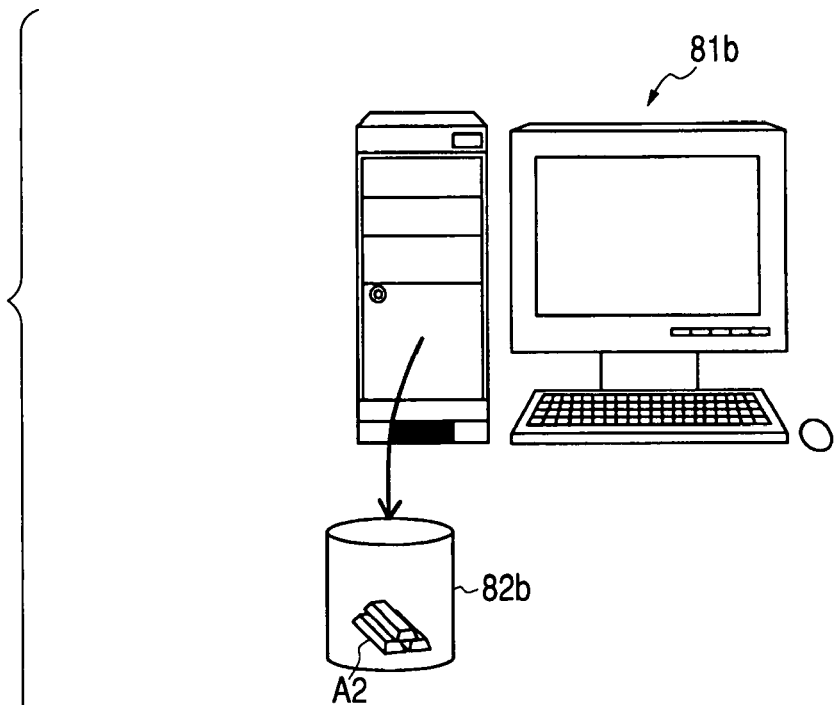

NUMBER OF LOG-IN QUALIFIERS TO DB 82b    50 PERSONS
NUMBER OF LOG-IN QUALIFIERS FROM PC 81b TO DB 82b

NUMBER OF TOTAL LOG-IN OPERATION TIMES FROM PC 81b    100 TIMES/MONTH
NUMBER OF ABNORMAL LOG-IN OPERATION TIMES FROM PC 81b    0.1 TIME/MONTH

NUMBER OF SECURITY HANDLING MUTUAL AGREEMENTS WITHIN LOG-IN
QUALIFIERS FROM PC 81b TO DB 82b

LOG-IN MANAGING CONTENT TO PC 81b    USER NAME AND PASSWORD COLLATION

COMMUNICATION MANAGING CONTENT OF NETWORK OF PC 81b AND DB 82b
COMMUNICATION DATA ENCRYPTION

FIG. 19

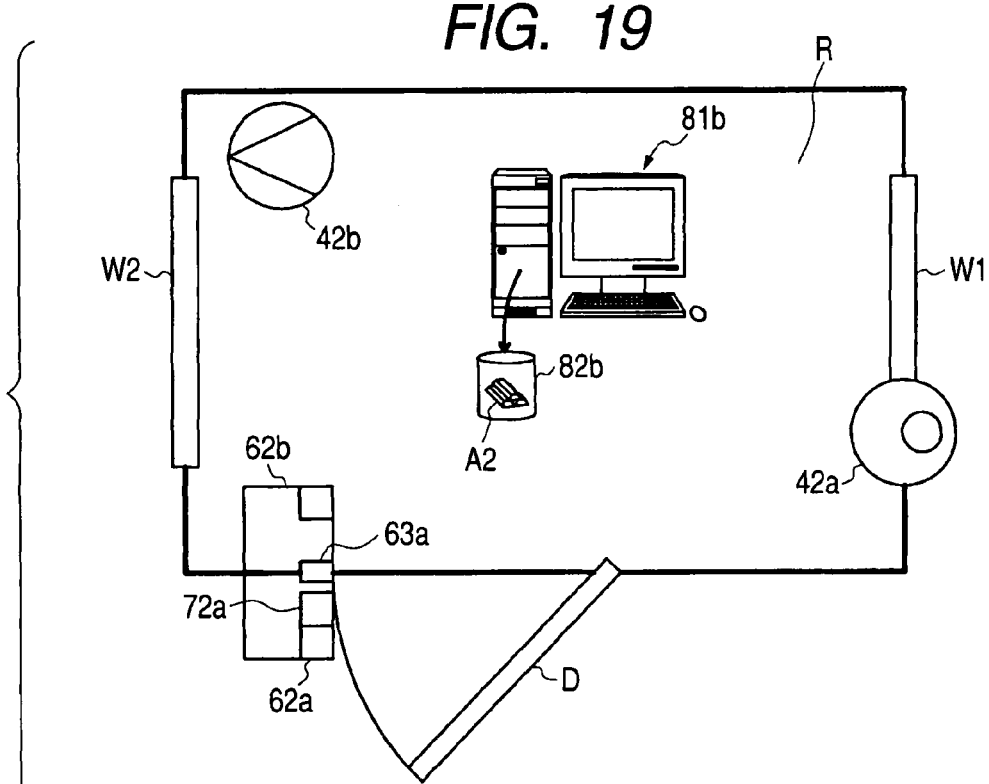

NUMBER OF EMPLOYEES WORKING IN UNDERTAKING OFFICE  1,000 PERSONS
NUMBER OF ENTRY QUALIFIERS INTO ROOM R  100 PERSONS

TOTAL NUMBER OF OPERATION TIMES OF DOOR D  5,000 TIMES/MONTH
NUMBER OF ABNORMAL OPERATION TIMES OF DOOR D  100 TIMES/MONTH

NUMBER OF SECURITY HANDLING MUTUAL AGREEMENTS WITHIN ENTRY QUALIFIERS

GLASS DESTRUCTION DETECTION SENSITIVITY OF WINDOW W1 USING GLASS SENSOR 42a
INVASION DETECTION SENSITIVITY FROM WINDOW W2 USING PASSIVE SENSOR 42b
ID AUTHENTICATING LEVEL OF NON-CONTACT IC CARD
BIOMETRICS PERSONAL AUTHENTICATION  NOT MADE

NUMBER OF LOG-IN QUALIFIERS TO DB 82b  50 PERSONS
NUMBER OF LOG-IN QUALIFIERS FROM PC 81b TO DB 82b

NUMBER OF TOTAL LOG-IN OPERATION TIMES FROM PC 81b  100 TIMES/MONTH
NUMBER OF ABNORMAL LOG-IN OPERATION TIMES FROM PC 81b  0.1 TIME/MONTH

NUMBER OF SECURITY HANDLING MUTUAL AGREEMENTS WITHIN LOG-IN
QUALIFIERS FROM PC 81b TO DB 82b

LOG-IN MANAGING CONTENT TO PC 81b  USER NAME AND PASSWORD COLLATION

COMMUNICATION MANAGING CONTENT OF NETWORK OF PC 81b AND DB 82b
COMMUNICATION DATA ENCRYPTION

SECURITY MONITORING DEVICE, SECURITY MONITORING SYSTEM AND SECURITY MONITORING METHOD

BACKGROUND OF THE INVENTION

1. Field of the Invention

The present invention relates to a device, a system and a method for monitoring a degree of security to appropriately secure security of assets.

2. Background Art

In a party such as an enterprise, various kinds of security devices are introduced and a security system is constructed to protect assets such as information, money, equipment, articles of commerce, and persons. Risk management for taking an appropriate measure by evaluating risk damaging the assets is executed. The risk damaging the assets and the security protecting the assets have a reciprocal relation. Therefore, there is also a case in which the security is evaluated instead of the risk.

For example, there are devices described in the following patent literature 1 and patent literature 2 as a security measure for protecting information assets and a security evaluating device for evaluating this measure. In patent literature 1, a device for constructing the system and a risk analyzing technique are selected by a user, and a menace able to be caused in the selected constructional device and a security policy able to counteract the menace are extracted from a database stored in advance. On the basis of the selected risk analyzing technique, information relating to generating possibility of each menace and the magnitude of loss is inputted by the user, and the risk of each menace is calculated. A priority degree of the security policy is determined from this calculating result. The security policy and the priority degree are listed and displayed. The existence of execution of the security policy is inputted by the user, and an executing situation is totalized and displayed as a security evaluating result. In patent literature 2, a measure sufficiency ratio showing an effect provided by executing the risk measure selected by the user is calculated and displayed on the basis of a risk reducing ratio of each measure shown in a measure defining file stored in advance. Further, an optimum security measure is sequentially selected from information assets of a large risk amount on the basis of the risk reducing ratio and cost of each measure shown in the measure defining file, a risk amount, etc. showing an economical value of the information assets inputted by the user.

Patent literature 1: JP-A-2002-352062
Patent literature 2: JP-A-2002-24526

In the above former security evaluating device, it is necessary for a person to collect, determine and input information relative to risk such as the generating possibility of the menace, the magnitude of loss, and the risk reducing ratio. Analyses of the security and the risk, etc. are made on the basis of only these input contents. However, information relative to risk is changed by a change such as movements and increases and decreases of a thing and a person, etc. naturally caused during a daily business operation. It is very difficult for a person to collect, determine and input information relative to risk in conformity with this change. Therefore, there is a great fear that information relative to risk deviating from reality is inputted. When the information relative to risk deviating from reality is inputted in this way, a result of analyses, etc. of security and risk made on the basis of only the input contents also deviates from reality. Therefore, even when this result is outputted, no states of security and risk can be accurately recognized, and no appropriate measure can be also taken.

SUMMARY OF THE INVENTION

The present invention solves the above problem, and its object is to provide a security monitoring device, a security monitoring system and a security monitoring method able to accurately recognize the states of security and risk and take an appropriate measure.

The present invention resides in a security monitoring device connected to a security device and monitoring security, and comprising:

monitoring-collecting means for monitoring and collecting information from the security device in real time;

analyzing-estimating means for analyzing and estimating a security risk change on the basis of the information monitored and collected by the monitoring-collecting means; and output means for outputting a result analyzed and estimated by the analyzing-estimating means.

"Security risk change" means a change in a safety degree or a danger degree of assets to be protected.

The present invention also resides in a security monitoring system constructed by a security device, and a security monitoring device connected to the security device and monitoring security, wherein the security device transmits set information or detected information to the security monitoring device, and the security monitoring device monitors and collects information from the security device in real time, and analyzes and estimates a security risk change on the basis of this information, and outputs the analyzed and estimated results.

Further, the present invention resides in a security monitoring method for monitoring security relating to a security device, wherein information from the security device is monitored and collected in real time, and a security risk change is analyzed and estimated on the basis of this information, and the analyzed and estimated results are outputted.

In accordance with the above constructions, the information from the security device is automatically monitored and collected in real time by the security monitoring device. The security risk change is analyzed and estimated on the basis of this information, and its result is outputted. Accordingly, the output result can be conformed to reality in comparison with a case in which the result is outputted by making analyses, etc. of security and risk on the basis of only information manually inputted as in the former device. Therefore, the states of security and risk during a daily business operation are accurately recognized from the above output result, and an appropriate measure can be taken.

Further, in one embodiment mode of the present invention, a control means for controlling security strength on the basis of the result analyzed and estimated by the analyzing-estimating means is arranged in the above security monitoring device. As this one example, the control means changes a setting parameter of the security device, access qualification with respect to the security device or a security division. The "security division" is the range of an object for securing and monitoring security, and also includes a range of information communication, etc. as well as the range of a spatial place.

In accordance with the above construction, the security strength is automatically appropriately changed by the security monitoring device on the basis of the results of analyses and estimation of the security risk change, and predetermined safety can be secured. In particular, the security strength relating to setting of the security device can be raised by strictly changing the setting parameter of the security device. Further, the security strength relating to access qualification of the security device can be raised by strictly limiting the access qualification with respect to the security device. Further, the security strength of the security division can be raised by enlarging and hierarchically forming the security division.

Further, in the security monitoring device in one embodiment mode of the present invention, the monitoring-collecting means monitors and collects a setting state of the security device and the number of access times with respect to the security device, and the analyzing-estimating means analyzes and estimates the security risk change on the basis of the setting state and the number of access times. As this one example, the analyzing-estimating means calculates static risk corresponding force on the basis of the setting state, and calculates dynamic risk corresponding force on the basis of the number of access times, and calculates synthetic risk corresponding force on the basis of the static risk corresponding force and the dynamic risk corresponding force, and calculates occurrence frequency of risk on the basis of the synthetic risk corresponding force. The "risk corresponding force" is a degree of security of a narrow sense opposed to risk, and is also a degree for protecting assets from a menace threatening the assets by the security system constructed by introduction of the security device. In these degrees, the degree for protecting the assets from the menace by introducing and setting the security device is "static risk corresponding force". The degree for protecting the assets from the menace by an operating state of the security system, an operating system and morals of a user is "dynamic risk corresponding force". "Synthetic risk corresponding force" is calculated from these static risk corresponding force and dynamic risk corresponding force. "Occurrence frequency of risk" is a frequency of occurrence of risk due to failure to protect the assets from the menace.

In accordance with the above construction, the security risk change is analyzed and estimated on many sides, and the states of security and risk can be accurately recognized in detail from output results. Further, when the static risk corresponding force, the dynamic risk corresponding force, the synthetic risk corresponding force and the occurrence frequency of risk are calculated and outputted, these states are quantitatively recognized and it becomes easy to judge whether which measure relating to one of these states is required. Accordingly, the required measure can be rapidly and appropriately taken.

Further, in the security monitoring device in one embodiment mode of the present invention, the analyzing-estimating means analyzes and estimates the security risk change on the basis of the information monitored and collected by the monitoring-collecting means, and an acquired asset value.

In accordance with such a construction, the occurrence frequency of risk is calculated on the basis of the information from the security device monitored and collected in real time. Further, risk is calculated on the basis of the occurrence frequency and an asset value, and the state of risk can be accurately and quantitatively recognized.

Further, in the security monitoring device in one embodiment mode of the present invention, the analyzing-estimating means calculates the asset value in real time on the basis of acquired asset quantity and the asset value per unit quantity.

In accordance with such a construction, the asset value is automatically calculated by the security monitoring device, and risk can be accurately calculated and outputted on the basis of the asset value and the information from the security device monitored and collected in real time.

Further, in the security monitoring device in one embodiment mode of the present invention, the monitoring-collecting means monitors and collects reading information from the security device for reading an identifier attached to an asset in real time, and the analyzing-estimating means detects the asset quantity in real time on the basis of the reading information monitored and collected by the monitoring-collecting means.

In accordance with such a construction, a position and quantity of the asset can be detected in real time even when a change such as a movement and an increase and a decrease of the asset is caused during a daily business operation. The present asset value can be accurately calculated on the basis of the present asset quantity located in the security division of a monitoring object and the asset value per unit quantity.

Further, in the security monitoring device in one embodiment mode of the present invention, when the security division of a monitoring object is hierarchically formed, the monitoring-collecting means monitors and collects information from the security device located in each layer in real time, and the analyzing-estimating means calculates risk corresponding force every each layer on the basis of the information monitored and collected by the monitoring-collecting means, and also calculates the risk corresponding force of the entire security division on the basis of each risk corresponding force.

In accordance with such a construction, risk of the entire security division hierarchically formed can be calculated. Further, each layer of the security division hierarchically formed, the entire risk corresponding force and the state of risk can be accurately and quantitatively recognized, and a required appropriate measure can be judged and taken every each layer or as a whole.

In accordance with the present invention, the security risk change is automatically analyzed and estimated in real time in the security monitoring device, and a result conformed to reality is outputted. Accordingly, the states of security and risk during the daily business operation are accurately recognized, and an appropriate measure can be taken.

BRIEF DESCRIPTION OF THE DRAWINGS

FIG. 4 is a view showing a security situation of a first embodiment.

FIG. 6 is a view showing a security managing constant table.

FIG. 13 is a view showing an occurrence frequency class table.

FIG. 14 is a view showing a security measure candidate table.

FIG. 15 is a view showing a security situation of a second embodiment.

FIG. 16 is a view showing a security situation of a third embodiment.

FIG. 17 is a view showing a security situation of a fourth embodiment.

FIG. 19 is a view showing a security situation of a fifth embodiment.

DESCRIPTION OF THE PREFERRED EMBODIMENTS

Figure 1:
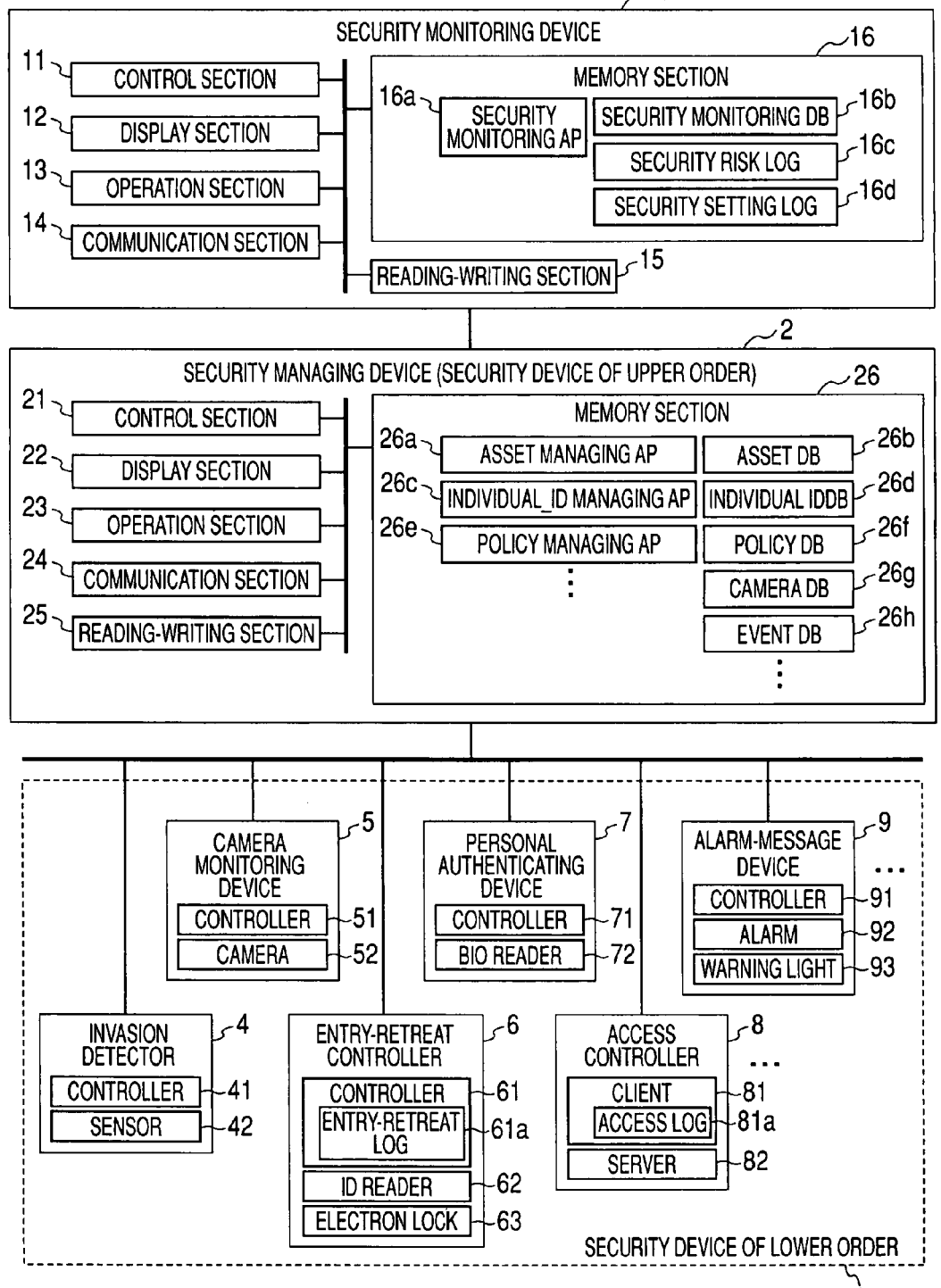
FIG. 1 is a constructional view of a security monitoring system.

FIG. 1 is a view showing the construction of a security monitoring system 100 in accordance with an embodiment mode of the present invention. For example, the security monitoring system 100 is operated in an enterprise to monitor security for protecting assets such as information, money, equipment, articles of commerce, and persons, possessed in the enterprise. The security monitoring system 100 is constructed from a security monitoring device 1, a security managing device 2 as a security device of an upper order, and a security device 3 of a lower order.

The security monitoring device 1 is constructed by a personal computer, etc. For example, the security monitoring device 1 is arranged in a managing room, etc. located in the interior of a house. The security monitoring device 1 is electrically connected to the security managing device 2, and is electrically connected to the security device 3 through the security managing device 2. A control section 11 is constructed from CPU, a memory, etc. A display section 12 is constructed from a display of CRT or LCD, etc. An operation section 13 is constructed from a mouse and a keyboard. A communication section 14 is constructed from a modem, a publicly known interface circuit, etc. A reading-writing section 15 is constructed from a publicly known magnetic disk, an optical disk, or a drive and a card reader, etc. for reading and writing information with respect to an information recording medium such as a memory card. A memory section 16 is constructed from a memory and a hard disk.

Various kinds of programs and data for controlling the operation of each section by the control section 11 are stored to the memory section 16. In these programs and data, security monitoring AP 16a is an application program for "visualizing" (visually recognizing) states of security and risk by monitoring security. Security monitoring DB 16b is a database collecting information registered and utilized during execution of the security monitoring AP 16a. Security risk log 16c records information relative to security and risk acquired during the execution of the security monitoring AP 16a. Security setting log 16d records setting information relative to security changed during the execution of the security monitoring AP 16a. The control section 11 executes the security monitoring AP 16a, and displays predetermined information in the display section 12 in accordance with the security monitoring AP 16a. The control section 11 further stores and registers information for monitoring security inputted by the operation section 13 to the security monitoring DB 16b. Further, the control section 11 monitors security as described later in accordance with the security monitoring AP 16a.

The security managing device 2 is constructed from a client and a server constructed by a personal computer. For example, the security managing device 2 is arranged in a managing room, etc. located in the interior of a house. The security managing device 2 is electrically connected to each of the security monitoring device 1 and plural devices 4 to 9 included in the security device 3 of a lower order. In FIG. 1, only one security managing device 2 is shown, but there is also a case in which e.g., plural security managing devices 2 are arranged so as to correspond to the respective devices 4 to 9, etc. The constructions of a control section 21, a display section 22, an operation section 23, a communication section 24, a reading-writing section 25 and a memory section 26 are similar to the constructions of the above control section 11, display section 12, operation section 13, communication section 14, reading-writing section 15 and memory section 16.

Various kinds of programs and data for controlling the operation of each section by the control section 11 are stored to the memory section 26. In these programs and data, asset managing AP 26a is an application program for managing possessed assets. Asset DB 26b is a database collecting information (e.g., name, kind, quantity, value, possessed position, allocated ID, etc.) relative to assets registered during the execution of the asset managing AP 26a. Individual ID managing AP 26c is an application program for managing an individual such as an employee and ID allocated to this individual. Individual ID DB 26d is a database collecting information (e.g., name, post, the distinction of sex, career, biometrics information, allocated ID, etc.) relative to an attribute and ID of the individual registered during the execution of the individual ID managing AP 26c.

Policy managing AP 26e is an application program for managing an established security policy. As the security policy, for example, there are an agreement relative to a security division, equipment of security devices 2, 3, etc. and an agreement relative to going in and out of a person with respect to the security division, or an agreement relative to access to information equipment of a personal computer, etc. and information assets of a database, etc. The security division is a range of an object for securing and monitoring security, and is not limited to a range of a spatial place, but also includes a range with respect to information communication, etc. Policy DB 26f is a database collecting information (e.g., position of security division, positions of security devices 2, 3, entry-retreat qualification, access qualification, etc.) relative to the security policy registered during the execution of the policy managing AP 26e. Camera DB 26g is a database collecting data of a monitoring screen image photographed by a camera monitoring device 5 of the security device 3 of a lower order. Event DB 26h is a database collecting information relative to an event detected by each of the devices 4 to 9, etc. of the security device 3 of a lower order. In addition to these databases, there are a program, etc. for managing each of the devices 4 to 9, etc. of the security device 3 of a lower order in the memory section 26. Information stored to each of DBs 26b, 26d, 26f to 26h, etc. of the memory section 26 is utilized during the execution of the security monitoring AP 16a.

Plural devices for securing various securities such as an invasion detector 4, a camera monitoring device 5, an entry-retreat controller 6, a personal authenticating device 7, an access controller 8, and an alarm-message device 9 are included in the security device 3 of a lower order. Each of these devices 4 to 9, etc. are arranged on the spot, etc. desirous to secure security. In these devices, the invasion detector 4 is constructed from a controller 41, a sensor 42, etc. The sensor 42 detects invasion of a person, an abnormal state able to perform invasion, etc. The controller 41 transmits a detecting result of the sensor 42 to the security managing device 2. The camera monitoring device 5 is constructed from a controller 51, a camera 52 for monitoring, etc. The camera 52 photographs a situation of the spot. The controller 51 transmits a screen image photographed by the camera 52 to the security managing device 2.

The entry-retreat controller 6 is constructed from a controller 61, an ID reader 62, an electron lock 63, etc. The electron lock 63 locks and unlocks a door, etc. arranged in an inlet-outlet port of the spot. The ID reader 62 is a device for reading individual ID recorded to a recording medium such as a non-contact IC card, etc. possessed by an individual, or ID of assets recorded to a recording medium such as an ID tag, etc. attached to assets. The controller 61 collates the individual ID read by the ID reader 62, and ID of an entry-retreat qualifier transmitted and set by the security managing device 2, and judges whether these IDs are conformed or not. The controller 61 then controls the operation of the electron lock 63 on the basis of this judging result, and allows or inhibits entry and retreat from the door. Further, the controller 61 records information such as an entry-retreat situation, operating situations of the ID reader 62 and the electron lock 63, and ID read by the ID reader 62 to an entry-retreat log 61*a*, and transmits this information to the security managing device 2. Further, the controller 61 transmits ID of an asset read by the ID reader 62 to the security managing device 2. The personal authenticating device 7 is constructed from a controller 71, a bio-reader 72, etc. The bio-reader 72 is a device for reading biometrics information such as a fingerprint of an individual, the vein of a palm of a hand, an iris, a face image, or a voiceprint. The controller 71 collates the biometrics information read by the bio-reader 72, and biometrics information of an authenticating object person transmitted and set by the security managing device 2, and judges whether the biometrics information is conformed or not. The controller 71 then authenticates or denies that it is of the authenticating object person himself (herself) on the basis of the judging result, and performs an output operation to the security managing device 2, etc.

The access controller 8 is constructed from a client 81, a server 82, etc. The client 81 is constructed by a personal computer used by an individual. The client 81 and the server 82 are connected by a network. The client 81 collates information such as the client 81, bios, an application program and a file stored to this client 81, a server 82, a user name, a password, ID, etc. inputted to get access to a database, a file, etc. stored to the server 82, and information such as a user name, a password, and ID of an access qualifier transmitted and set from the security managing device 2. The client 81 then judges whether the information is conformed or not. The client 81 further allows or inhibits access to the above access destination on the basis of the judging result. Further, the client 81 records an access situation to the above access destination, and information such as inputted user name, password, and ID to an access log 81*a*, and transmits these access situation and information to the security managing device 2. The alarm-message device 9 is constructed from a controller 91, an alarm 92, a warning light 93, etc. The controller 91 receives commands from the security managing device 2, and gives a warning by the alarm 92 or the warning light 93. The controller 91 also transmits a message to an unillustrated terminal device possessed by a guard and a person in charge of security.

Figure 2:
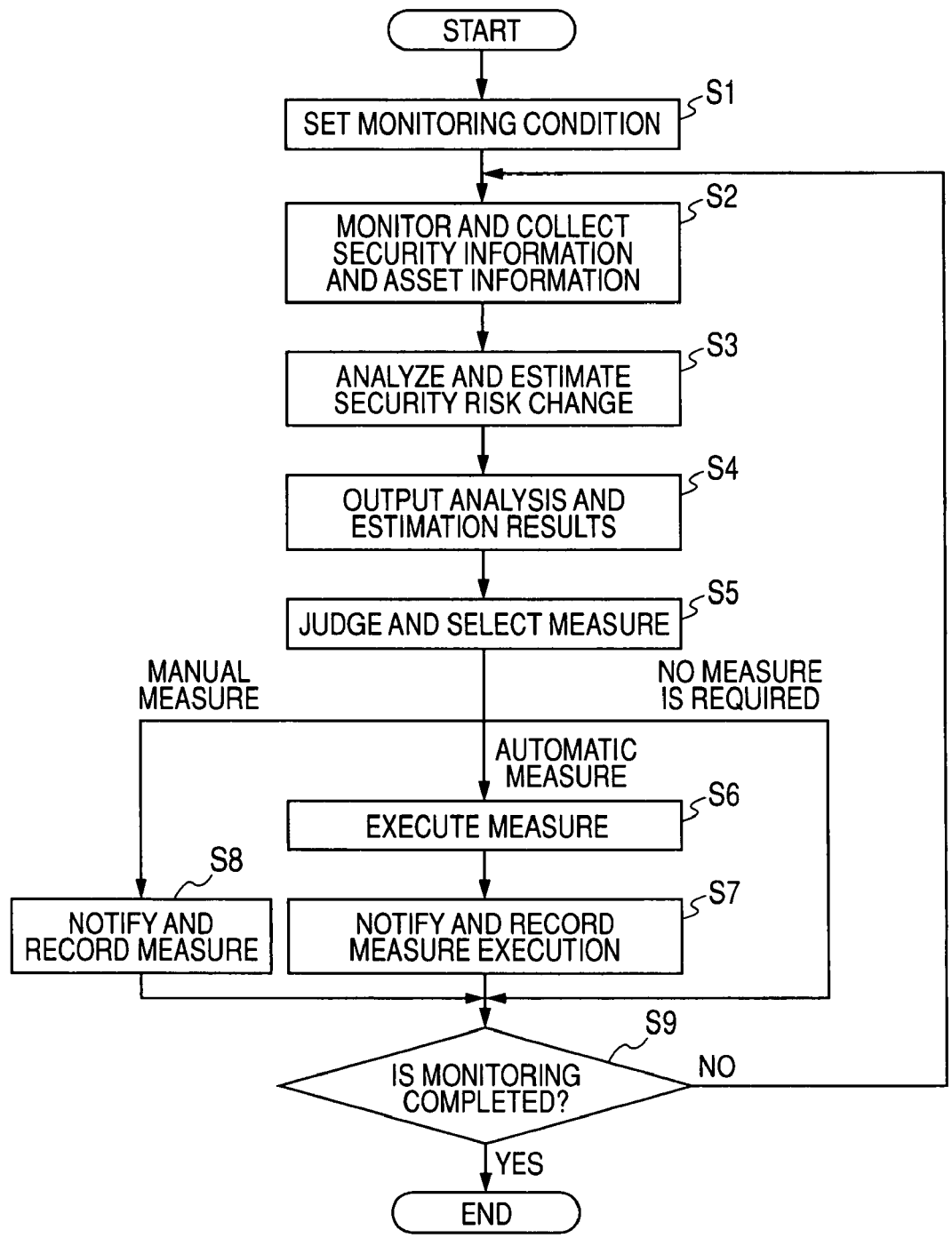
FIG. 2 is a flow chart showing a basic procedure of security monitoring processing.

FIG. 2 is a flow chart showing a basic procedure of security monitoring processing executed by the security monitoring device 1. This security monitoring processing is executed by the control section 11 in accordance with the security monitoring AP 16*a*. First, the control section 11 sets a condition for monitoring security (step S1). Specifically, for example, a user inputs information for specifying a monitoring object such as assets, a security division, a security device, a kind of risk, and a period by the operation section 13. The condition is set by the control section 11 on the basis of the input information. Further, for example, a monitoring object is enumerated in advance, and information for specifying the monitoring object and a monitoring order are registered to the security monitoring DB 16*b*. The condition may be also automatically set by the control section 11 on the basis of the registered contents.

Next, the control section 11 monitors and collects security information and asset information from the security devices 2, 3 in real time on the basis of the monitoring condition (step S2). Specifically, for example, the control section 11 transmits a command for transmitting information relative to security relating to the monitoring condition and information relative to assets to the security managing device 2 by the communication section 14. Thus, the control section 21 of the security managing device 2 retrieves asset DB 26*b* and policy DB 26*f*, etc., and reads-out the security information and the asset information relating to the monitoring condition from these DBs, and transmits these information to the security monitoring device 1 by the communication section 24. Further, the control section 21 retrieves asset DB 26*b*, policy DB 26*f*, etc., and specifies the security device 3 relating to the monitoring condition, and transmits a command for transmitting the security information, etc. to the security device 3. Thus, setting information of the security device 3 relating to the monitoring condition, acquiring information in the security device 3, etc. are transmitted as the security information from the security device 3 to the security monitoring device 1 through the security managing device 2. Thus, the control section 11 can monitor and collect the security information and the asset information from the security devices 2, 3 in real time. The control section 11 and the communication section 14 constitute one embodiment mode of a monitoring collecting means in the present invention.

Next, the control section 11 analyzes and estimates a security risk change on the basis of the monitored and collected security information and asset information, and information stored to the security monitoring DB 16*b* (step S3). Specifically, for example, a safety degree and a danger degree of assets to be protected are quantitatively calculated, and are compared with allowance values set in advance, and magnitudes are analyzed. Calculated values are recorded to the security risk log 16*c* together with a calculation date as the present calculating values. Further, if values calculated in the past with respect to the safety degree and the danger degree about the same monitoring object are recorded to the security risk log 16*c*, values from the past calculating values to the present calculating values are pursued in time series, and a change tendency is analyzed, and a transition in the future is estimated. The control section 11 constitutes one embodiment mode of an analyzing estimating means in the present invention.

Next, the control section 11 outputs analyzed and estimated results (step S4). Specifically, for example, the above calculating values and allowance values, etc. are shown as a graph, and are displayed as an image in the display section 12. Thus, a user can recognize states of security and risk in real time. The control section 11 and the display section 12 constitute one embodiment mode of an output means in the present invention. Further, for example, information showing the above results may be also transmitted to a person in charge of security, etc. by an electronic mail, etc.

Next, the control section 11 judges and selects a measure on the basis of the analyzed and estimated results and information stored to the security monitoring DB 16*b* (step S5). Specifically, for example, the control section 11 compares the above calculating values and allowance values of the safety degree and the danger degree, and judges necessity of a measure for changing security strength. Here, if no calculating value exceeds the allowance value, the control section 11 judges that no measure is required. In contrast to this, if the calculating value exceeds the allowance value, the control section 11 judges that the measure is required. The control section 11 then selects a measure among measure candidates registered to the security monitoring DB 16*b* in advance. If the selected measure is an automatic measure able to be executed by controlling the operations of the security devices 2, 3, the control section 11 controls the operations of the security devices 2, 3 and executes the measure (step S6), and changes the security strength of a monitoring object. Further, the execution of the measure is displayed in the display section 12, etc. and is notified, and contents of the measure and an execution date are recorded to the security setting log 16*d* (step S7). Further, after it is judged that the measure is required, the control section 11 displays that the measure should be executed in the display section 12, etc., and performs notification if the selected measure is a manual measure unable to be executed unless the measure is manually executed. The control section 11 then records contents of the measure and its notifying date to the security setting log 16*d* (step S8). Thereafter, the security strength of the monitoring object is changed by executing the measure by a person in charge of security, etc. receiving the above notification. The control section 11 constitutes one embodiment mode of the control means in the present invention.

Next, the control section 11 judges whether the monitoring of security is terminated or not in step S9. Specifically, for example, if a user inputs instructions for terminating the monitoring by the operation section 13, it is judged that the monitoring of security is terminated (step S9: YES), and processing is terminated. In contrast to this, if no user inputs the instructions for terminating the monitoring, it is judged that no monitoring of security is terminated (step S9: NO). It then proceeds to step S2, and subsequent processing is continued. Further, for example, a limit is set with respect to time and the number of processing times executed from step S2 to step S9, and it may be also judged whether the monitoring of security is terminated or not. When processing is continued after an automatic measure is executed in step S6, an effect of this measure is shown in subsequent steps S2 to S5, and can be recognized.

Figure 3:
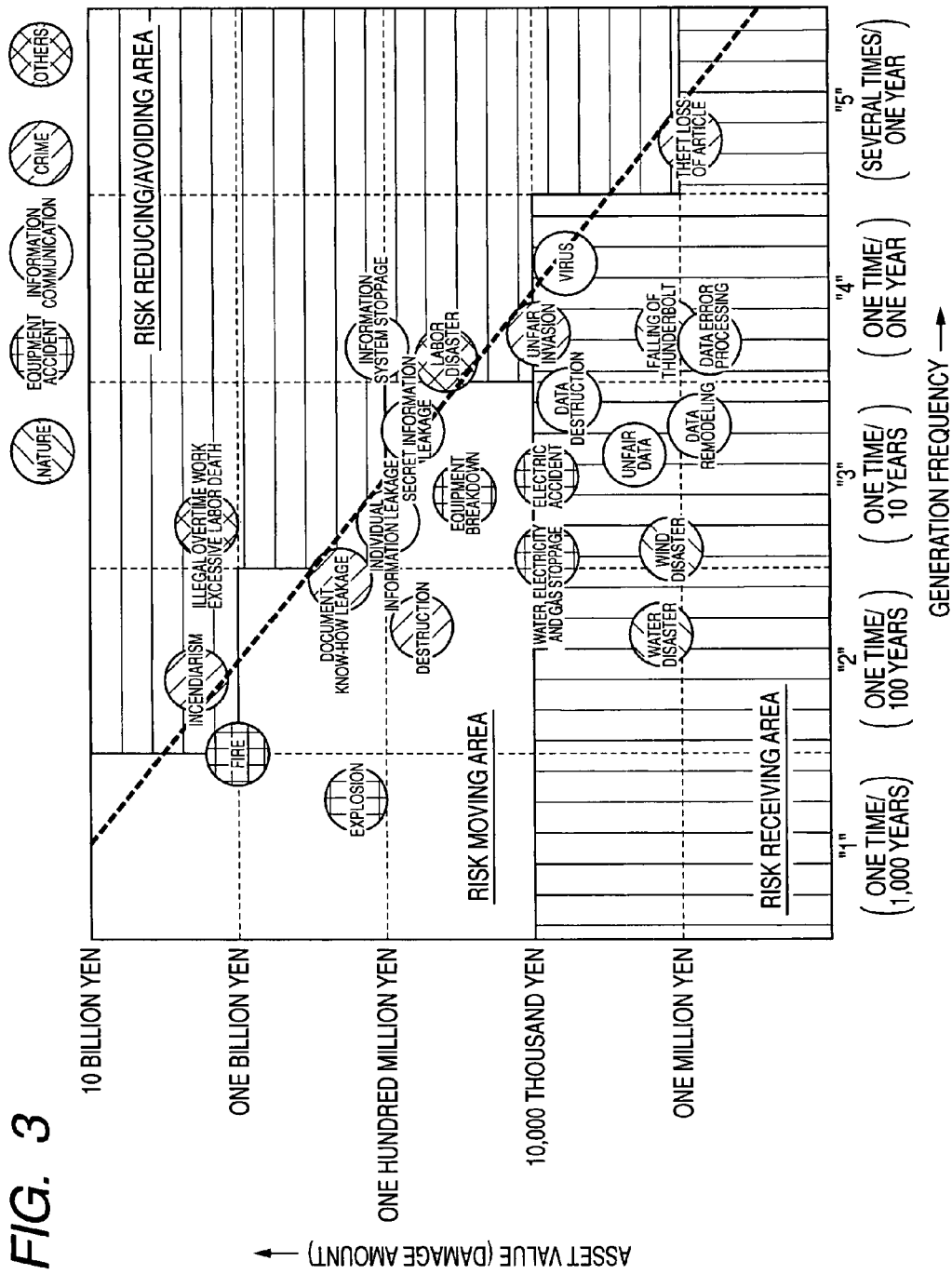
FIG. 3 is a view showing one example of analysis and estimation results of a security risk change.

FIG. 3 is a view showing one example of analyzing and estimating results of the security risk change outputted in step S4 of FIG. 2. For example, this figure is displayed in the display section 12 of the security monitoring device 1. "Destruction", "personal information leakage", etc. shown by circle marks are kinds of risk which can possibly occurs in a certain security division. As shown in a rightward upward portion, the kind of risk is classified into five portions of "natural", "equipment accident", "information communication", "crime" and "others". The axis of abscissa shows an occurrence frequency of each risk. The occurrence frequency of risk is calculated on the basis of security information, etc. monitored and collected in step S2 of FIG. 2, and is classified into five classes of "1" to "5". The axis of ordinate is a value of assets to be protected existing in a certain security division, and shows a damage amount generated when it is damaged by each risk. The asset value is calculated on the basis of asset information, etc. monitored and collected in step S2 of FIG. 2. Each risk is plotted in an intersecting position of the occurrence frequency and the asset value. A dotted line slantingly extending from a leftward upward portion to a rightward downward portion shows an allowance value set in advance. An area shown downward by longitudinal line hatching is a risk receiving area. An area shown in a leftward upward portion with no hatching is a risk transfer area. An area shown in a rightward upward portion by transversal line hatching is a risk reducing/avoiding area. The measure is executed such that each risk is located below the allowance value. In step S5 of FIG. 2, necessity of the measure is automatically judged, and the executed measure is selected. However, a person in charge of security, etc. seeing this figure also recognizes the state of risk, and judges the necessity of the measure, and selects and executes an appropriate measure.

A concrete example will next be enumerated and explained. FIG. 4 is a view showing a security situation of a first embodiment. A room R is arranged in a certain undertaking office of an enterprise. There is an object asset A1 such as money, equipment, or an article of commerce to be protected within the room R. The number of employees of the undertaking office is 1,000 persons. In this number, the number of entry-retreat qualifiers having entry-retreat qualification with respect to the room R is 100 persons. Further, in this number of entry-retreat qualifiers, the number of security handling mutual agreements mutually agreeing with an agreement relative to handling of security established in the undertaking office is 95 persons. As an invasion path to the room R, there are windows W1, W2 and door D. Glass doors of windows W1, W2 are always closed and locked. A glass sensor 42*a* for detecting destruction of glass of the window W1 is arranged in the window W1. A passive sensor 42*b* for detecting invasion of a person from the window W2 is arranged by the side of the window W2. Detection sensitivities of both the sensors 42*a*, 42*b* are set to "1" at present. Both the sensors 42*a*, 42*b* are one example of the sensor 42 of the invasion detector 4 of FIG. 1. Namely, an invasion managing system constructed from the invasion detector 4 including the sensors 42*a*, 42*b* and the security managing device 2 is introduced as a security system in the room R.

The door D is always closed and is locked by an electron lock 63*a*. Card readers 62*a*, 62*b* for reading ID from an unillustrated non-contact IC card possessed by an individual are arranged in the vicinity of the inside and the outside of the door D. The electron lock 63*a* and the card readers 62*a*, 62*b* are one example of the electron lock 63 and the ID reader 62 of the entry-retreat controller 6 of FIG. 1. When ID read by the card readers 62*a*, 62*b* is conformed to ID of an entry-retreat qualifier with respect to the room R, the electron lock 63*a* is unlocked and the door D is opened and entry-retreat can be performed with respect to the room R. An ID authenticating level (e.g., communication sensitivities of card readers 62*a*, 62*b*, and a level of collating contents, etc. of ID) of the non-contact IC card using the card readers 62*a*, 62*b* is set to "2" at present. The number of total operation times (i.e., number of total operation times of the electron lock 63*a*) of the door D is 5,000 times per one month. In this number of total operation times, number of abnormal operation times (i.e., number of abnormalities generated in the electron lock 63*a*) of the door D is 100 times per one month. Namely, an entry-retreat managing system constructed by the entry-retreat controller 6 including the card readers 62*a*, 62*b* and the security managing device 2 is introduced into the room R as a security system. A bio reader 72a for reading a fingerprint of an individual is arranged in the vicinity of the outside of the door D. The bio reader 72a is one example of the bio reader 72 of the personal authenticating device 7 of FIG. 1. Namely, a personal authenticating system constructed from the personal authenticating device 7 including the bio reader 72a and the security managing device 2 is introduced as the security system in the room R. Personal authentication using the bio reader 72a is set so as not to be performed at present.

Figure 5:
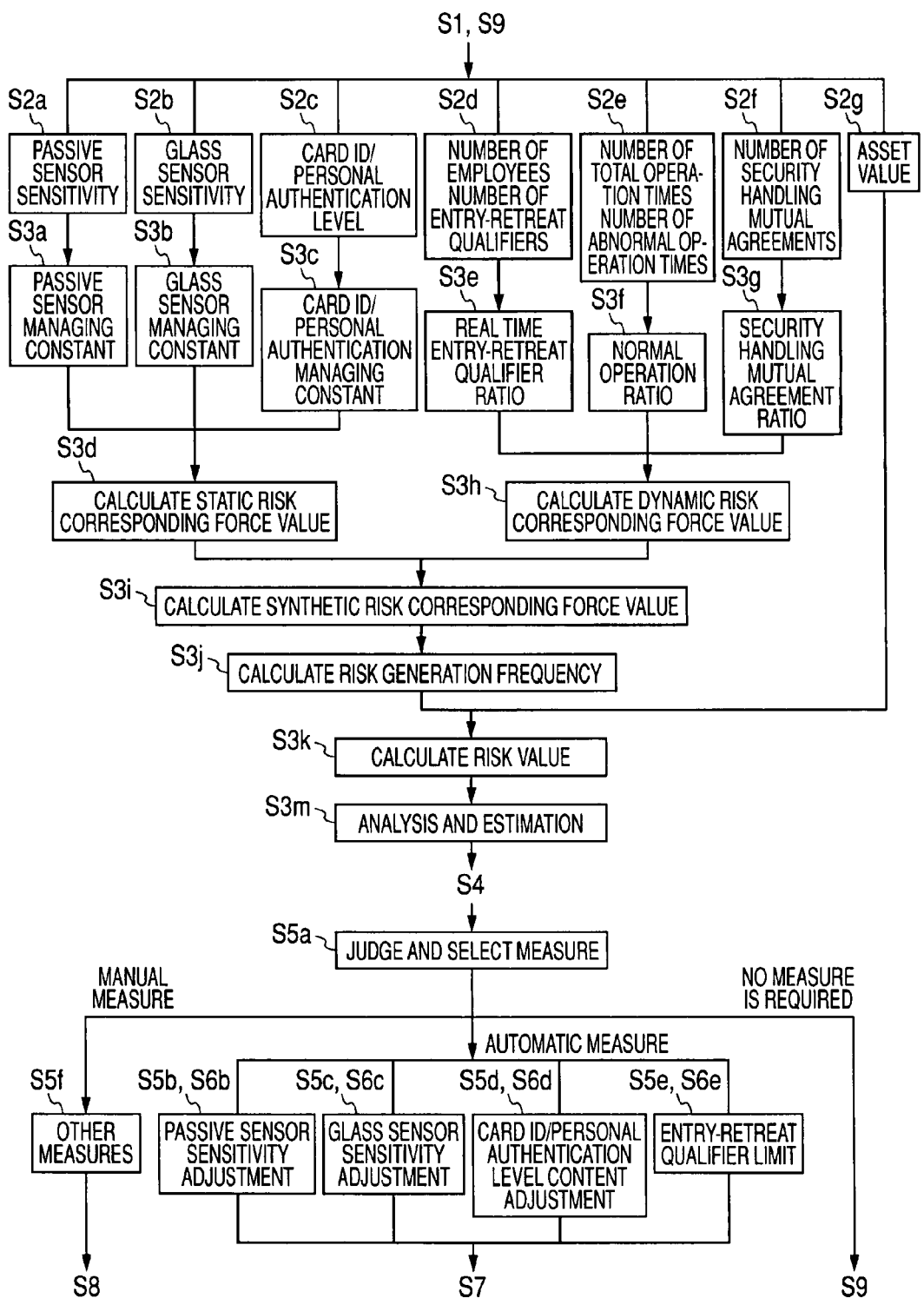
FIG. 5 is a flow chart showing a detailed procedure of one portion of the security monitoring processing of the first embodiment.

FIG. 5 is a flow chart showing a detailed procedure of security monitoring processing of the first embodiment. This flow chart shows details of partial processing in the flow chart of FIG. 2. Namely, steps S2a to S2g of FIG. 5 show details of step S2 of FIG. 2. Steps S3a to S3m of FIG. 5 show details of step S3 of FIG. 2. Steps S5a to S5f and S6b to S6e of FIG. 5 show details of steps S5 and S6 of FIG. 2. Steps S1, S4, S7, S8, S9 of FIG. 5 are respectively the same as steps of the same reference numerals of FIG. 2.

A user starts security monitoring AP 16a in the security monitoring device 1 to monitor security of an object asset A1 located within the room R of FIG. 4, and inputs a monitoring condition by the operation section 13. Here, "room R" is inputted as a security division, and e.g., "theft loss" is inputted as a kind of risk. Thus, the control section 11 sets these input information as a monitoring condition (step S1 of FIG. 2), and monitors and collects security information and asset information from the security devices 2, 3 in real time on the basis of the monitoring condition (step S2). More particularly, information of the existence of the object asset A1 in the room R and information of an asset value of the object asset A1 are registered to the asset DB 26b of the security managing device 2. Therefore, the control section 11 monitors that the information of the asset value of the object asset A1 is transmitted from the security managing device 2, and collects this information (step S2g of FIG. 5). In addition to this, for example, the information of the asset value of the object asset A1 may be also inputted by a user. Information of the number of employees as the number of a menace, the number of entry-retreat qualifiers with respect to the room R and the number of security handling mutual agreements within the entry-retreat qualifiers is respectively registered to individual ID DB 26d and policy DB 26f of the security managing device 2. Therefore, the control section 11 monitors that the information of the number of employees, the number of entry-retreat qualifiers and the number of security handling mutual agreements is transmitted from the security managing device 2, and collects this information (steps S2d, S2f). Further, the information on the arrangement of a glass sensor 42a and a passive sensor 42b of the invasion detector 4, and the card readers 62a, 62b of the entry-retreat controller 6 is registered to policy DB 26f of the security managing device 2 as the security device 3 in the room R. Therefore, the control section 11 monitors that information of sensitivity of each of the present sensors 42a, 42b is transmitted from the invasion detector 4 through the security managing device 2, and collects this information (steps S2a, S2b). Further, the control section 11 monitors that information of the present non-contact IC card ID authenticating level using the card readers 62a, 62b is transmitted from the entry-retreat controller 6 through the security managing device 2, and collects this information (step S2c). Further, information on the number of total operation times and the number of abnormal operation times of the door D until the present time is recorded to the entry-retreat log 61a of the entry-retreat controller 6. Therefore, the control section 11 monitors that the information on the number of total operation times and the number of abnormal operation times of the door D until the present time is transmitted from the entry-retreat controller 6 through the security managing device 2, and collects this information (step S2e).

Next, the control section 11 analyzes and estimates a security risk change on the basis of the above security information and asset information monitored and collected, and information stored to the security monitoring DB 16b (step S3 of FIG. 2). More particularly, the control section 11 respectively quantitatively calculates a static risk corresponding force value, a dynamic risk corresponding force value, a synthetic risk corresponding force value, an occurrence frequency of risk, and a risk value of the room R as follows. The control section 11 then analyzes a change tendency and estimates a transition of the future. The risk corresponding force is a degree of security of a narrow sense opposed to risk, and is also a degree for protecting assets from a menace threatening assets by the security system of entry-retreat management, etc. constructed by introducing the security devices 2, 3. In these degrees, the degree for protecting assets from the menace by introducing and setting the security devices 2, 3 is static risk corresponding force. The degree for protecting assets from the menace by an operating state of the security system, an operating system and morals of a user is dynamic risk corresponding force. Synthetic risk corresponding force is calculated from this static risk corresponding force and the dynamic risk corresponding force. The occurrence frequency of risk is a frequency of occurrence of risk due to failure to protect the assets from the menace.

Information of a security managing constant table shown in FIG. 6 is registered to the security monitoring DB 16b. This security managing constant table shows a degree for protecting assets from the menace by arranging security devices 2 to 9, etc., and operating the security devices 2 to 9, etc. by predetermined setting, i.e., a safety degree able to secure the assets as a managing constant as a numerical value from "0 to 1". As the managing constant is large, the safety degree is high. FIG. 6 illustrates only elements required in the following explanation. As mentioned above, both the present sensitivities of the passive sensor 42b and the glass sensor 42a are "1", and the present non-contact IC card ID authenticating level is "2". Therefore, the control section 11 respectively reads-out a managing constant "0.90" corresponding to the present sensitivity "1" of the passive sensor 42b, a managing constant "0.90" corresponding to the present sensitivity "1" of the glass sensor 42a, and a managing constant "0.95" corresponding to the present non-contact IC card ID authenticating level "2" from the security managing constant table (steps S3a, S3b, S3c of FIG. 5). The static risk corresponding force value of the room R is calculated as follows from the managing constant (step S3d).

(Static risk corresponding force of room R)=(static risk corresponding force in each invasion path)= (managing constant using non-contact IC card ID authentication in door D)×(managing constant using glass sensor 42a in window W1)×(managing constant using passive sensor 42b in window W2) =0.95×0.90×0.90=0.77

Further, the control section 11 respectively calculates an entry-retreat qualifier ratio with respect to the room R, a normal operation ratio for entry-retreat, and a security handling mutual agreement ratio within the entry-retreat qualifiers as follows from the number of employees, the number of entry-retreat qualifiers with respect to the room R, the number of total operation times of the door D, the number of abnormal operation times of the door D, and the number of security handling mutual agreements within the entry-retreat qualifiers (steps S3e, S3f, S3g). Further, the control section 11 calculates the dynamic risk corresponding force value of the room R as follows from these ratios, etc. (step S3h).

(Entry-retreat qualifier ratio with respect to room R)= (number of entry-retreat qualifiers)/(number of employees)=100/1,000=0.1

(Normal operation ratio for entry-retreat)=(number of total operation times of door D−number of abnormal operation times of door D)/(number of total operation times of door D)=(5,000−100)/5, 000=0.98

(Security handling mutual agreement ratio within entry-retreat qualifiers)=(number of security handling mutual agreements within entry-retreat qualifiers)/(number of entry-retreat qualifiers) =95/100=0.95

(Dynamic risk corresponding force of room R)=(origin of morals of organization)+(number of remaining origin of morals of organization)×(1− entry-retreat qualifier ratio with respect to room R)×(normal operation ratio for entry-retreat)× (security handling mutual agreement ratio within entry-retreat qualifiers)=0.1+0.9×(1−0.1)×0.98× 0.95 =0.85

In the above calculating formulas, the origin of morals of organization is the dynamic risk corresponding force able to be originally secured. This origin of morals of organization is established to "0.1", and this number of remaining is established to "0.9" in advance. Further, only the normal operation ratio of door D is considered as the normal operation ratio for entry-retreat because the windows W1, W2 as other invasion paths are always perfectly closed and are not opened and closed so that it is not necessary to consider the normal operation ratio. When there are plural invasion paths considering the normal operation ratio, it is sufficient to set only a lowest normal operation ratio among these plural invasion paths to the normal operation ratio for entry-retreat.

Further, the control section 11 calculates the synthetic risk corresponding force value of the room R as follows from the above static risk corresponding force value and dynamic risk corresponding force value of the room R (step S3i).

(Synthetic risk corresponding force value of room R)=(static risk corresponding force value of room R)×(dynamic risk corresponding force value of room R)=0.77×0.85=0.65

Further, the control section 11 calculates occurrence frequency of risk of theft loss of object asset A1 in the room R as follows from the above synthetic risk corresponding force value (step S3j).

(Occurrence frequency of risk of theft loss of object asset A1 in room R)=1−(synthetic risk corresponding force value of room R)=1−0.65=0.35

Further, the control section 11 calculates a risk value of theft loss of object asset A1 in the room R as follows from the above occurrence frequency of risk and an asset value of object asset A1 collected from the security managing device 2 (step S3k).

(Risk value of theft loss of object asset A1 in room R)=(occurrence frequency of risk of theft loss of object asset A1 in room R)×(asset value of object asset A1)=0.35×(e.g., one hundred million yen) =35,000 thousand yen When the calculation is made as mentioned above, the control section 11 records each of the above calculating values to the security risk log 16c as the present calculating value together with a calculating date. The control section 11 then compares the present calculating value with an allowance value set in advance, and analyzes magnitudes. Further, if values calculated in the past with respect to the safety degree and the danger degree about the same monitoring object are recorded to the security risk log 16c, the control section 11 pursues values from the past calculating values to the present calculating values in time series, and analyzes a change tendency and estimates a transition of the future. Further, the control section 11 forms and outputs these analyzing and estimating results as a graph (step S4 of FIG. 2).

Figure 7:
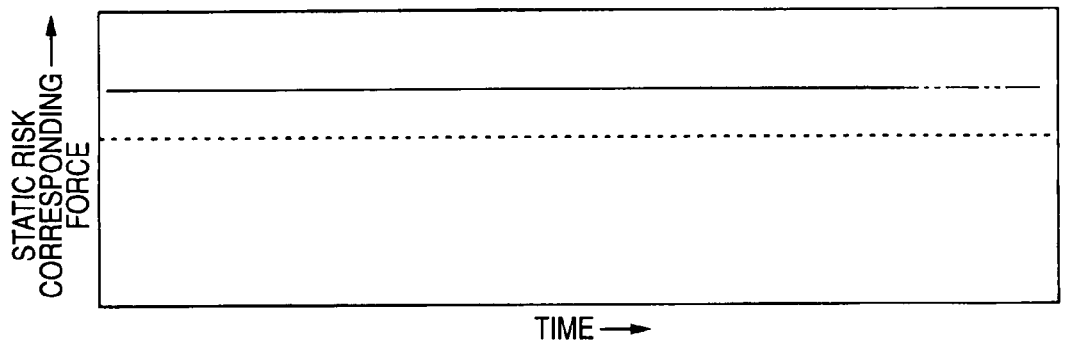
FIG. 7 is a view showing one example of analysis and estimation results of the security risk change of the first embodiment.
Figure 8:
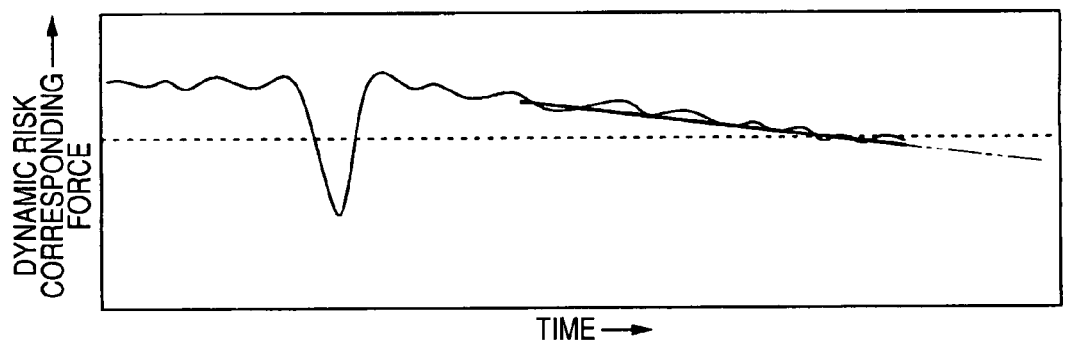
FIG. 8 is a view showing one example of analysis and estimation results of the security risk change of the first embodiment.
Figure 9:
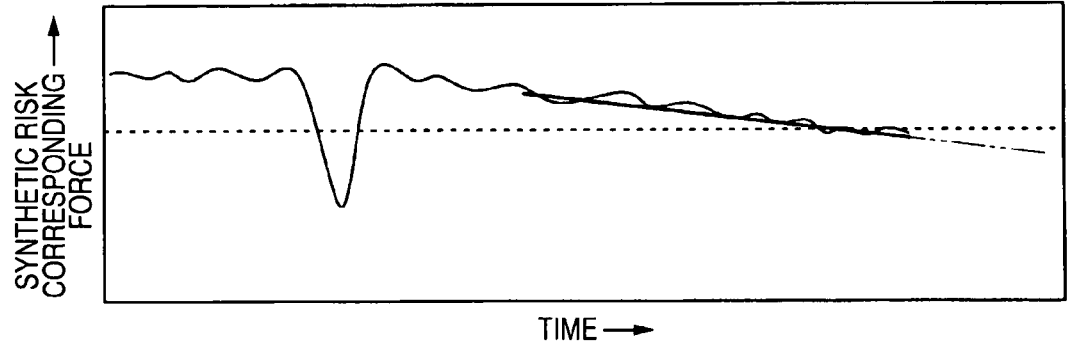
FIG. 9 is a view showing one example of analysis and estimation results of the security risk change of the first embodiment.
Figure 10:
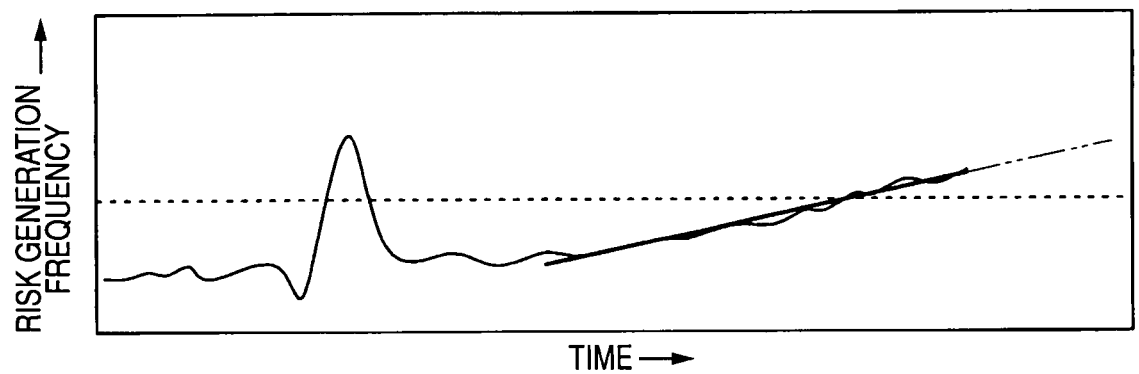
FIG. 10 is a view showing one example of analysis and estimation results of the security risk change of the first embodiment.
Figure 11:
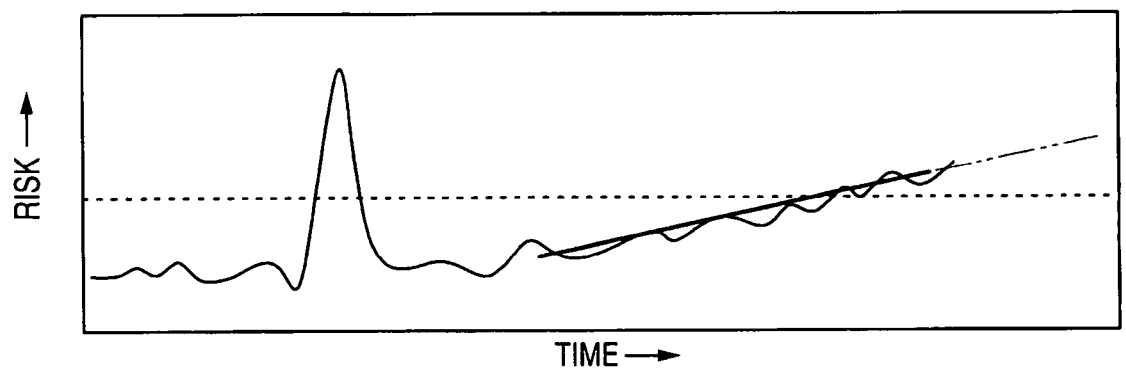
FIG. 11 is a view showing one example of analysis and estimation results of the security risk change of the first embodiment.

FIGS. 7 to 12 are views showing one example of the analyzing and estimating results of the security risk change of the first embodiment. For example, each figure is displayed in the display section 12 of the security monitoring device 1. FIG. 7 is a view showing a time-like change of the static risk corresponding force value of the room R. FIG. 8 is a view showing a time-like change of the dynamic risk corresponding force value of the room R. FIG. 9 is a view showing a time-like change of the synthetic risk corresponding force value of the room R. FIG. 10 is a view showing temporal change of occurrence frequency of risk of theft loss of the object asset A1 in the room R. FIG. 11 is a view showing temporal change in a risk value of theft loss of the object asset A1 in the room R. Thin solid lines shown in the respective figures are respectively the static risk corresponding force value, the dynamic risk corresponding force value, the synthetic risk corresponding force value, the occurrence frequency of risk, and the risk value. Dotted lines are respective allowance values. Thick solid lines shown in FIGS. 8 to 11 are first order approximate lines of the thin solid lines, and two-dotted chain lines are estimating lines of respective values extending the first order approximate lines in a future direction. Risk corresponding force of theft loss of the object asset A1 in the room R, i.e., a change state of security can be visually recognized from FIGS. 7 to 9. A change state of risk of theft loss of the object asset A1 in the room R can be visually recognized from FIGS. 10 and 11. A sudden change of each value seen on the left-hand side of FIGS. 8 to 11 is caused by invasion of a doubtful person to the room R, an accident in the room R, a breakdown of the door D, etc. A sudden change of each value seen on the right-hand side of FIGS. 8 to 11 is caused by an increase of the object asset A1, an increase of an employee, etc. It is possible to estimate that the tending change is also continued in the future from the first order approximate line and the estimating line. In FIGS. 7 to 9, each risk corresponding force value is preferably an allowance value or more. In FIGS. 10 and 11, each of the occurrence frequency and the risk value is preferably an allowance value or less.

Figure 12:
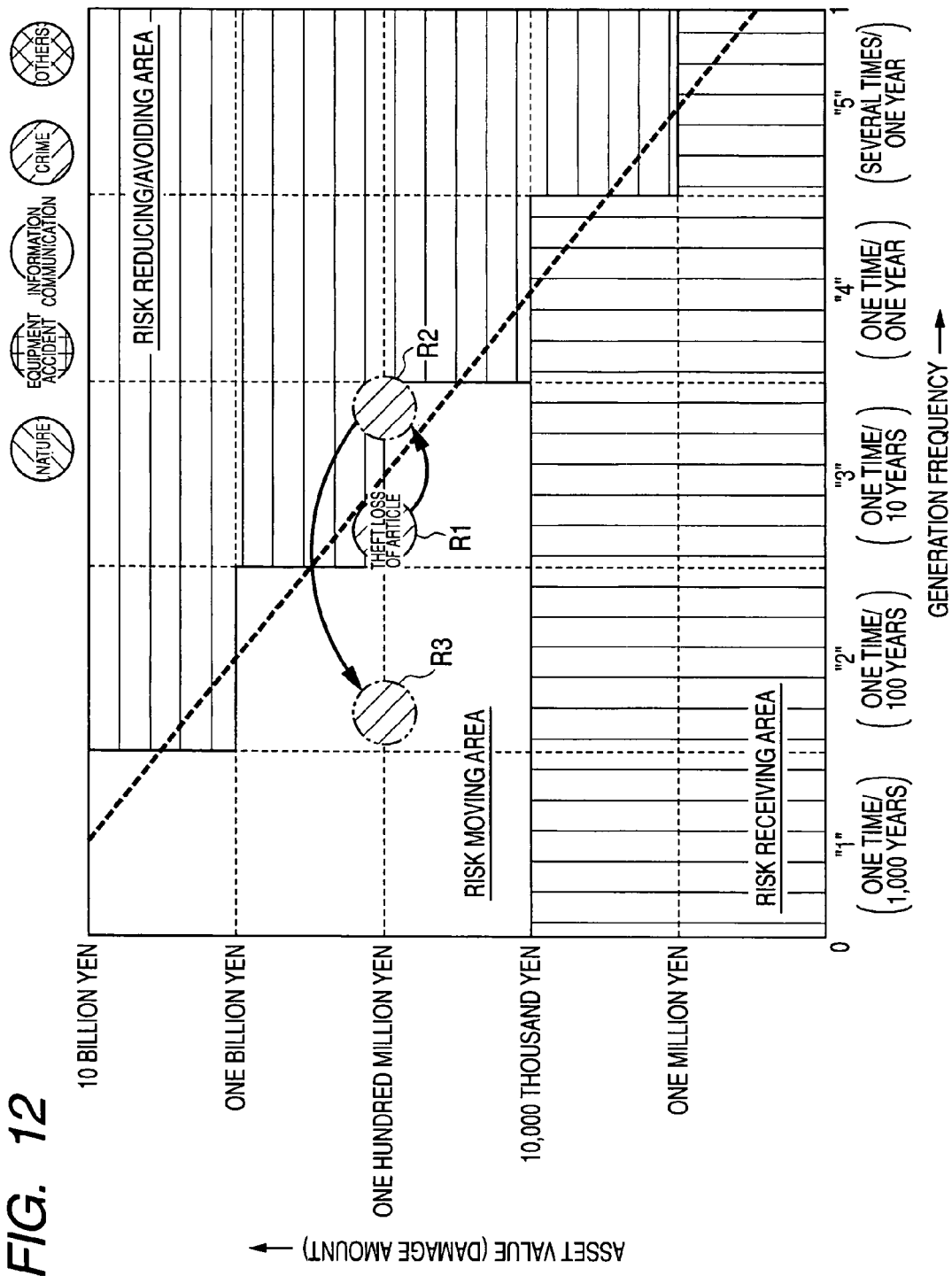
FIG. 12 is a view showing one example of analysis and estimation results of the security risk change of the first embodiment.

FIG. 12 is a view showing a state of risk of theft loss of the object asset A1 in the room R. A display form of this figure is similar to that of the above FIG. 3. Each of R1 to R3 is risk of theft loss of the object asset A1 in the room R at a certain time point. The occurrence frequency of risk is classified into five classes of "1" (one time in 1,000 years) to "5" (several times in one year), and is easily recognized. FIG. 13 is an occurrence frequency class table for classifying the occurrence frequency of risk into five classes. Information on this occurrence frequency class table is registered to the security monitoring DB 16b. For example, if the occurrence frequency of risk calculated as mentioned above is 0 or more and is less than 0.1, it is classified into class "1" occurred at one time in 1,000 years. A magnitude and a change with respect to the allowance value of risk of theft loss of the object asset A1 in the room R can be visually recognized from FIG. 12. For example, at a time point of R1, the occurrence frequency of risk is "0.35", and the asset value of the object asset A1 is "one hundred million yen", and the risk becomes the allowance value or less. For example, when employees are increased and the occurrence frequency of risk is raised from this time point of R1, the risk exceeds the allowance value as shown by a time point of R2.

When the results of analyses and estimation are outputted as mentioned above, the control section 11 judges and selects a measure on the basis of the results of analyses and estimation and information stored to the security monitoring DB 16b (step S5 of FIG. 2 and step S5a of FIG. 5). For example, when each of the static risk corresponding force value, the dynamic risk corresponding force value and the synthetic risk corresponding force value calculated as mentioned above is the allowance value or more, and each of the occurrence frequency of risk and the risk value is the allowance value or less, the control section 11 judges that no measure for changing the security strength of the room R is required. In contrast to this, when one of the static risk corresponding force value, the dynamic risk corresponding force value and the synthetic risk corresponding force value is smaller than the allowance value, or is estimated so as to soon become smaller than the allowance value, or one of the occurrence frequency of risk and the risk value is greater than the allowance value or is estimated so as to soon become greater than the allowance value, the control section 11 judges that the measure for changing the security strength of the room R is required. The control section 11 then retrieves the security monitoring DB 16b and selects the measure.

Information of a security measure candidate table shown in FIG. 14 is registered to the security monitoring DB 16b. This security measure candidate table shows a candidate of an automatic measure able to be executed by controlling the operations of the security devices 2, 3 by the control section 11, and a candidate of a manual measure unable to be executed unless the measure is manually executed. For example, there are a sensor sensitivity adjustment, an authenticating level adjustment, an authenticating content adjustment, an access qualification limit, a security division adjustment, etc. as the automatic measure candidate. The authenticating content adjustment is to change authenticating contents such that personal authentication using biometrics information is performed in addition to card ID authentication, for example, or the personal authentication performed using fingerprint information about one finger is changed to use fingerprint information of plural fingers, etc. The access qualification limit is to limit a person given access qualification and reduce the number of access qualifiers as in a case in which e.g., the access qualification was given to all members of a development section but is given to only a section chief of the development section, etc. The access qualification also includes entry-retreat qualification, etc. for performing advancement and retreat with respect to a certain place as well as access qualification about information communication for reading-out and writing data with respect to a database, etc. There are another access qualification limit, another security division adjustment, a security device extension, security device repair-exchange, an asset movement, a measure consideration request, etc. as the manual measure candidate.

The control section 11 extracts an executable measure from the security measure candidate table so as to raise the security strength of the room R, and specifically sets the measure so as to be conformed to a security situation of the room R. An invasion managing system including the passive sensor 42b and the glass sensor 42a, an entry-retreat managing system including the card readers 62a, 62b, and a personal authenticating system including the bio reader 72a are introduced as the security system in the room R. Therefore, a sensitivity adjustment of the passive sensor 42b (step S5b of FIG. 5), a sensitivity adjustment of the glass sensor 42a (step S5c), an authenticating level of personal authentication using ID authentication or fingerprint information of a non-contact IC card, an adjustment of the authenticating contents (step S5d), and an entry-retreat qualifier limit (step S5e) to the room R are respectively set as the automatic measure. Other measures enumerated in the security measure candidate table are set as the manual measure (step S5f). The control section 11 then selects one or plural measures of steps S5b to S5f in accordance with the magnitude of a difference between the above calculating value and the allowance value. For example, if the difference is very small, only one of the automatic measures is selected. Further, if the difference is large to a certain extent, all the automatic measures are selected. Further, if the difference is very large, the manual measure is selected. Otherwise, for example, the selection may be also sequentially made one by one from the automatic measures in consideration of the matter that steps S2 to S10 of FIG. 2 are repeatedly executed. Otherwise, the above set measure may be also displayed in the display section 12, and a user may also make a selection by the operation section 13.

When the sensitivity adjustment (steps S5b, S5c) of the passive sensor 42b and the glass sensor 42a of the automatic measure is selected, the control section 11 controls the operation of the invasion detector 4 through the security managing device 2, and changes the sensitivities of the sensors 42a, 42b from "1" set at present to e.g., stricter "2" (steps S6b, S6c). Further, when the authenticating level of the personal authentication using the ID authentication or the fingerprint information of the non-contact IC card, and the adjustment of the authenticating contents (step S5d) are selected, the control section 11 controls the operations of the entry-retreat controller 6 and the personal authenticating device 7 through the security managing device 2 so as to perform the personal authentication using the ID authentication and the fingerprint information of the non-contact IC card at e.g., an entry-retreat time with respect to the room R from the door D (step S6d). In this case, only when both the ID authentication and the personal authentication can be performed, the electron lock 63a is unlocked and the entry-retreat with respect to the room R is allowed. Further, when the entry-retreat qualifier limit (step S5e) to the room R is selected, the control section 11 controls the operations of the security managing device 2 and the entry-retreat controller 6 and more strictly limits the entry-retreat qualifier to the room R and reduces the number of entry-retreat qualifiers from "100 persons" set at present to e.g., "10 persons" (step S6e). When the automatic measure is executed as mentioned above, the control section 11 displays the execution of the above automatic measure in the display section 12, etc. and notifies this execution, and records contents and an executing date of the measure to the security setting log 16d (step S7 of FIG. 2). Thus, a person in charge of security, etc. see the recording contents of the security setting log 16d later and can automatically confirm the executed measure.

Further, when the manual measure and other measures (step S5f of FIG. 5) are selected, the control section 11 displays that the measure should be executed in the display section 12, etc., and notifies this execution. The control section 11 then records the contents of the measure and the notifying date to the security setting log 16d (step S8 of FIG. 2). Thereafter, a person in charge of security, etc. receiving the above notification executes the measure so that the security strength of a monitoring object is changed.

For example, as mentioned above, if the control section 11 then judges that the monitoring of security is terminated in step S9 of FIG. 2 (step S9: YES), processing is terminated. In contrast to this, if the control section 11 judges that no monitoring is terminated (step S9: NO), it proceeds to step S2 and subsequent processing is continued. When the processing is continued and the analysis and estimation results displayed in the display section 12 in step S4 are left and subsequent analysis and estimation results are added in the display, the states of security and risk can be recognized in real time and time series from changes of each risk corresponding force value, the occurrence frequency of risk and the risk value.

When the processing is continued after all the automatic measures of steps S6b to S6e of FIG. 5 are executed as mentioned above, effects of the measures are immediately shown in subsequent steps S2 to S5, and can be recognized. Namely, in step S2 of the next time, the control section 11 monitors and collects that the sensitivities of the sensors 42a, 42b are change to "2" in real time (steps S2a, S2b of FIG. 5). Further, in addition to the matter that the ID authenticating level of the non-contact IC card is "2", the personal authentication using fingerprint information is executed and the matter that the authenticating level (e.g., a level of a threshold value, etc. of collation of biometrics information) is set to e.g., "2" is monitored and collected in real time (step S2c). Further, the matter that the number of employees is not changed from "1,000 persons", but both the number of entry-retreat qualifiers and the number of security handling mutual agreements within the entry-retreat qualifiers are changed to e.g., "10 persons" is monitored and collected in real time (steps S2d, S2f). The number of total operation times and the number of abnormal operation times of the door D, and the asset value of the object asset A1 are not changed. Accordingly, the same number of total operation times "5,000 times/month", the number of abnormal operation times "100 times/month" and the asset value "one hundred million yen" as the previous time are monitored and collected in real time (steps S2e, S2g).

In step S3 of the next time, the control section 11 then respectively quantitatively calculates the static risk corresponding force value, the dynamic risk corresponding force value, the synthetic risk corresponding force value, the occurrence frequency of risk and the risk value of the room R as follows, and analyzes and estimates the security risk change. When the static risk corresponding force value of the room R is calculated, both the sensitivities of the sensors 42a, 42b are "2", and both the levels of the card ID authentication and the personal authentication are "2". Accordingly, the managing constants corresponding to the sensors 42a, 42b are changed to "0.95" and the managing constant corresponding to card ID authentication+personal authentication is changed to "0.99" from the security managing constant table of FIG. 6.

(Static risk corresponding force value of room R)= (non-contact IC card ID authentication in door D+managing constant of personal authentication using fingerprint information)×(managing constant using glass sensor 42a in window W1)× (managing constant using passive sensor 42b in window W2)=0.99×0.95×0.95=0.89 (entry-retreat qualifier ratio with respect to room R)= (number of entry-retreat qualifiers)/(number of employees)=10/1,000=0.01

(Normal operation ratio for entry-retreat)=(number of total operation times of door D−number of abnormal operation times of door D)/(number of total operation times of door D)=(5,000−100)/5,000=0.98

(Security handling mutual agreement ratio within entry-retreat qualifiers)=(number of security handling mutual agreements within entry-retreat qualifiers)/(number of entry-retreat qualifiers) =10/10=1.0

(Dynamic risk corresponding force of room R)=(origin of morals of organization)+(number of remaining of origin of morals of organization)× (1−entry-retreat qualifier ratio with respect to room R)×(normal operation ratio for entry-retreat)×(security handling mutual agreement ratio within entry-retreat qualifiers)=0.1+0.9×(1− 0.01)×0.98×1.0=0.97

(Synthetic risk corresponding force value of room R)=(static risk corresponding force value of room R)×(dynamic risk corresponding force value of room R)=0.89×0.97=0.86

(Occurrence frequency of risk of theft loss of object asset A1 in room R)=1−(synthetic risk corresponding force value of room R)=1−0.86=0.14

(Risk value of theft loss of object asset A1 in room R)=(occurrence frequency of risk of theft loss of object asset A1 in room R)×(asset value of object asset A1)=0.14×(e.g., one hundred million yen) =1,400 (unit: ten thousand yen)

Each risk corresponding force value is increased before the measure from the above calculating results, and it is possible to recognize that the occurrence frequency of risk and the risk value are reduced. Further, when the above calculating values are displayed in each of FIGS. 7 to 12, the change of each value can be visually recognized. For example, since the occurrence frequency of risk of theft loss of object asset A1 in the room R is lowered to "0.14", the occurrence frequency is changed to class "2" (one time in 100 years) from the occurrence frequency class table of FIG. 13. Further, in FIG. 12, risk is transferred from position R2 to position R3, and it is possible to recognize that the risk becomes smaller than the allowance value.

In accordance with the above description, information from the security devices 2, 3 is automatically monitored and collected in real time in the security monitoring device 1, and the security risk change is analyzed and estimated on the basis of this information, and its result is outputted. Accordingly, the output result can be set to an actually conformed result in comparison with a case in which the result is outputted by making analyses, etc. of security and risk on the basis of only information manually inputted as in the former device. Therefore, the states of security and risk during a daily business operation can be accurately recognized from the above output result and an appropriate measure can be taken.

Further, the sensitivities of the sensors 42a, 42b and the authenticating level and the authenticating contents of the entry-retreat controller 6 and the personal authenticating device 7, or the entry-retreat qualification for allowing entry-retreat by the entry-retreat controller 6, etc. is automatically changed on the basis of the results of analyses and estimation of the security risk change in the security monitoring device 1. Accordingly, the security strength of room R of a security division is appropriately controlled and predetermined safety can be secured. In particular, the static risk corresponding force value, etc. can be raised by strictly changing the sensitivities of the sensors 42a, 42b, and the authenticating level and the authenticating contents of the entry-retreat controller 6 and the personal authenticating device 7. Further, the dynamic risk corresponding force value, etc. can be raised by strictly limiting the entry-retreat qualification.

Further, the static risk corresponding force value, the dynamic risk corresponding force value, the synthetic risk corresponding force value and the occurrence frequency of risk are calculated and outputted from the security information monitored and collected in real time from the security devices 2, 3. Thus, the states of security and risk can be accurately recognized in detail from a result in which the security risk change is analyzed and estimated on many sides and is outputted. In particular, each of the above values is quantitatively recognized, and it becomes easy to judge whether which measure relating to one of these values is required. Accordingly, a required measure can be rapidly and appropriately taken. Further, the state of risk can be accurately and quantitatively recognized by showing risk from the asset value monitored and collected from the above occurrence frequency of risk and the security devices 2, 3, and calculating the risk value.

FIG. 15 is a view showing a security situation of a second embodiment. The different point between the security situation of this second embodiment and the security situation of the first embodiment shown in FIG. 4 is that a RFID tag 64 of a wireless type recording ID as a proper identifier is attached to each object asset A1, and a tag reader 62t for reading ID from the RFID tag 64 is arranged in an invasion path of the room R for arranging the door D. The tag reader 62t is one example of the ID reader 62 of the entry-retreat controller 6 of FIG. 1. When each object asset A1 is taken in and out with respect to the room R from a certain invasion path of the door D, the tag reader 62t reads ID from the RFID tag 64 of each object asset A1. ID of each object asset A1 read by the tag reader 62t is then transmitted from the entry-retreat controller 6 to the security managing device 2 of FIG. 1 and the security monitoring device 1 through the security managing device 2.

Information of ID of the RFID tag 64 attached to each object asset A1 and the asset value per unit quantity (e.g., per one) of each object asset A1 are registered to the asset DB 26b of the security managing device 2. Therefore, the control section 21 of the security managing device 2 detects an existing position of each object asset A1 in real time from the information of ID of each object asset A1 from the entry-retreat controller 6, and registers this position to the asset DB 26b. The control section 11 of the security monitoring device 1 monitors and collects the information of ID of the object asset A1 read by the tag reader 62t, and information of ID of the object asset A1 located in the room R and stored to the asset DB 26b of the security managing device 2 and the asset value per unit quantity in real time. The control section 11 detects the asset quantity of the object asset A1 located in the room R in real time on the basis of the monitored and collected information of ID of the object asset A1. Further, the control section 11 calculates the asset value of the object asset A1 located in the room R in real time on the basis of the asset quantity and the asset value per unit quantity of the object asset A1. The information of the asset value per unit quantity of the object asset A1 may be also inputted by e.g., a user in addition to the above case.

When the above construction is set, going in and out with respect to the room R of the object asset A1 and the quantity located in the room R are automatically detected by the security monitoring device 1 in real time even when a change such as a movement, an increase and a decrease, etc. of the object asset A1 is caused during a daily business operation. The present asset value of the object asset A1 located in the room R can be accurately calculated. The risk value can be more accurately calculated and outputted on the basis of the asset value and the security information from the security devices 2, 3 monitored and collected in real time as mentioned above.

FIG. 16 is a view showing a security situation of a third embodiment. The different point between the security situation of this third embodiment and the security situation of the first embodiment shown in FIG. 4 is that the room R is arranged within a room Rb and a room Ra is arranged within the room R and the object asset A1 is located within the room Ra. Namely, the different point is that a security division of a monitoring object is hierarchically formed. Card readers 62c to 62f, electron locks 63b, 63c and doors Da, Db arranged in the respective rooms Ra, Rb are similar to card readers 62a, 62b, electron lock 63a and door D arranged in the room R. The control section 11 of the security monitoring device 1 of FIG. 1 monitors and collects security information and asset information from the security devices 2, 3 arranged and introduced into the respective rooms R, Ra, Rb in real time. The control section 11 then calculates the synthetic risk corresponding force value every each of the rooms R, Ra, Rb on the basis of the monitored and collected security information and asset information, etc. The control section 11 also calculates the synthetic risk corresponding force value of entire security divisions R, Ra, Rb on the basis of each synthetic risk corresponding force value.

When entry-retreat with respect to rooms R, Ra is managed by the entry-retreat controller 6 and the security managing device 2 of FIG. 1 including the card readers 62a to 62d and the electron locks 63a, 63b, and no entry-retreat with respect to room Rb is managed, i.e., a door Db can be always opened and closed and invasion to the room Rb is free, a security division monitored by the security monitoring device 1 is formed in two hierarchical layers in the rooms R, Ra. In this case, the control section 11 of the security monitoring device 1 calculates the synthetic risk corresponding force value of the entire security divisions R, Ra as follows. The value calculated in the first embodiment is cited with respect to each risk corresponding force value of the room R. Further, the values calculated in the first embodiment are referred with respect to the static risk corresponding force value and the dynamic risk corresponding force value of the room Ra.

(Static risk corresponding force value of room R)=0.77

(Dynamic risk corresponding force value of room R)=0.85

(Synthetic risk corresponding force value of room R)=(static risk corresponding force value of room R)×(dynamic risk corresponding force value of room R)=0.77×0.85=0.65

(Static risk corresponding force value of room Ra)= (managing constant using non-contact IC card ID authentication in door Da)=(managing constant using non-contact IC card ID authentication in door D)=0.95

(Dynamic risk corresponding force value of room Ra)=(dynamic risk corresponding force value of room R)=0.85

(Synthetic risk corresponding force value of room Ra)=(static risk corresponding force value of room Ra)×(dynamic risk corresponding force value of room Ra)=0.95×0.85=0.81

(Synthetic risk corresponding force value of entire security divisions R, Ra formed by two hierarchical layers)=(synthetic risk corresponding force value of outside division R)+((1−synthetic risk corresponding force value of outside division R)×synthetic risk corresponding force value of inside division Ra)=0.65+((1−0.65)×0.81)=0.93

It is understood from the above description that the respective synthetic risk corresponding force values of the rooms R, Ra are "0.65" and "0.81", but, in contrast to this, the synthetic risk corresponding force value of the entire security divisions R, Ra formed by two hierarchical layers is "0.93" and becomes high.

When entry-retreat with respect to the rooms R, Ra, Rb is managed by the entry-retreat controller 6 and the security managing device 2 including the card readers 62a to 62f and the electron locks 63a to 63c, the security division monitored by the security monitoring device 1 is formed by three hierarchical layers in the rooms R, Ra, Rb. In this case, the control section 11 of the security monitoring device 1 calculates the synthetic risk corresponding force value of the entire security divisions R, Ra, Rb as follows.

(Synthetic risk corresponding force value of room R)=0.65

(Synthetic risk corresponding force value of room Ra)=0.81

(Static risk corresponding force value of room Rb)= (managing constant using non-contact IC card ID authentication in door Db)=(managing constant using non-contact IC card ID authentication in door D)=0.95

(Dynamic risk corresponding force value of room Rb)=(dynamic risk corresponding force value of room R)=0.85

(Synthetic risk corresponding force value of room Rb)=(static risk corresponding force value of room Rb)×(dynamic risk corresponding force value of room Rb)=0.95×0.85=0.81

(Synthetic risk corresponding force value of room R seen from room Rb)=(synthetic risk corresponding force value of outside division Rb)+((1−synthetic risk corresponding force value of outside division Rb)×synthetic risk corresponding force value of inside division R)=0.81+((1−0.81)×0.65) =0.93

(Synthetic risk corresponding force value of entire security divisions R, Ra, Rb formed by three hierarchical layers)=(compound synthetic risk corresponding force value of outside divisions R, Rb)+((1−compound synthetic risk corresponding force value of outside divisions R, Rb)×synthetic risk corresponding force value of inside division R)=0.93+((1−0.93)×0.81)=0.99

It is understood from the above description that the respective synthetic risk corresponding force values of the rooms R, Ra, Rb are "0.65" and "0.81", and the synthetic risk corresponding force value of the entire security divisions R, Ra formed by two hierarchical layers is "0.93", but, in contrast to this, the synthetic risk corresponding force value of the entire security divisions R, Ra, Rb formed by three hierarchical layers is "0.99" and becomes high.

Further, the synthetic risk corresponding force value of the entire security divisions formed by N-hierarchical layers can be calculated as follows.

(Synthetic risk corresponding force value of entire security divisions formed by $N$-hierarchical layers)=compound synthetic risk corresponding force value of divisions until ($N$−1)-th hierarchical layer (i.e., entire outside of division of innermost side)+((1−compound synthetic risk corresponding force value of divisions until ($N$−1)-th hierarchical layer)×synthetic risk corresponding force value of division of $N$-th hierarchical layer (i.e., innermost side)

For example, when the synthetic risk corresponding force value of the entire security divisions calculated and hierarchically formed as mentioned above becomes smaller than an allowance value, the control section 11 of the security monitoring device 1 changes the sensitivities of the above sensors 42a, 42b, the authenticating level and the authenticating contents of the entry-retreat controller 6 and the personal authenticating device 7, or entry-retreat qualification for allowing entry-retreat by the entry-retreat controller 6, etc. In addition to this, the control section 11 enlarges and hierarchically forms the security division. Thus, the security strength of the security division is also raised and predetermined safety can be secured.

As mentioned above, when the synthetic risk corresponding force value of the entire security divisions hierarchically formed is calculated, the occurrence frequency of risk and the risk value of the entire security division hierarchically formed can be more accurately calculated and outputted from the synthetic risk corresponding force value. Further, each layer of the security division hierarchically formed and the entire synthetic risk corresponding force value and the state of risk can be recognized accurately and quantitatively, and a required appropriate measure can be judged and taken every each layer or as a whole.

FIG. 17 is a view showing a security situation of a fourth embodiment. A personal computer (hereinafter called "PC") 81b is arranged in a certain undertaking office of an enterprise. PC 81b is one example of the client 81 of the access controller 8 of FIG. 1 and is connected to a server 82 by a network. A database (hereinafter called "DB") 82b stored to the server 82 is logged-in from PC 81b, and it is possible to get access to information asset A2 such as individual information of a customer or secret information on business, etc. stored to DB 82b. The number of cases of information asset A2 is increased and decreased during a daily business operation. PC 81b collates information such as a user name, a password, ID, etc. inputted to log in bios, application, etc. mounted to this PC 81b, and information such as a user name, a password, ID, etc. of an access qualifier set by the security managing device 2. PC 81b then judges whether these information is conformed or not, and allows or inhibits the log-in and the access on the basis of this judging result. The server 82 collates information such as a user name, a password, and ID inputted to PC 81b to log in DB 82b and transmitted from PC 81b, and information such as a user name, a password, and ID of an access qualifier set by the security managing device 2. The server 82 then judges whether these information is conformed or not, and allows or inhibits the log-in and the access on the basis of the judging result. PC 81b has an access log 81a (FIG. 1) as a record of information such as log-in to a log-in destination and an access situation thereto, inputted user name, password, and ID. The record contents of the access log 81a are transmitted from PC 81b to the security managing device 2 and the security monitoring device 1 through the security managing device 2.

The number of log-in qualifiers having log-in qualification to DB 82b of the server 82 is 50 persons. In this number of log-in qualifiers, number of log-in qualifiers having log-in qualification from PC 81b to DB 82b is two persons. In this number of log-in qualifier from PC 81b to DB 82b, the number of security handling mutual agreements mutually agreeing with an agreement relative to the handling of security established in the undertaking office is two persons. The number of total log-in operation times logged in PC 81b or DB 82b from this PC 81b is 100 times per one month. In this number of total log-in operation times, the number of abnormal log-in operation times causing an abnormality such as a failure of log-in is 0.1 time per one month. At a log-in time of PC 81b or DB 82b from this PC 81b at present, the user name and the password are inputted by a user, and are collated with the user name and the password of the access qualifier. If the user name and the password are conformed, the log-in is set to be allowed. In contrast to this, if the user name and the password are not conformed, the log-in is set to be inhibited. Further, in a network connecting PC 81*b* and a server 83 at present, data are set so as to be ciphered and communicated.

Figure 18:
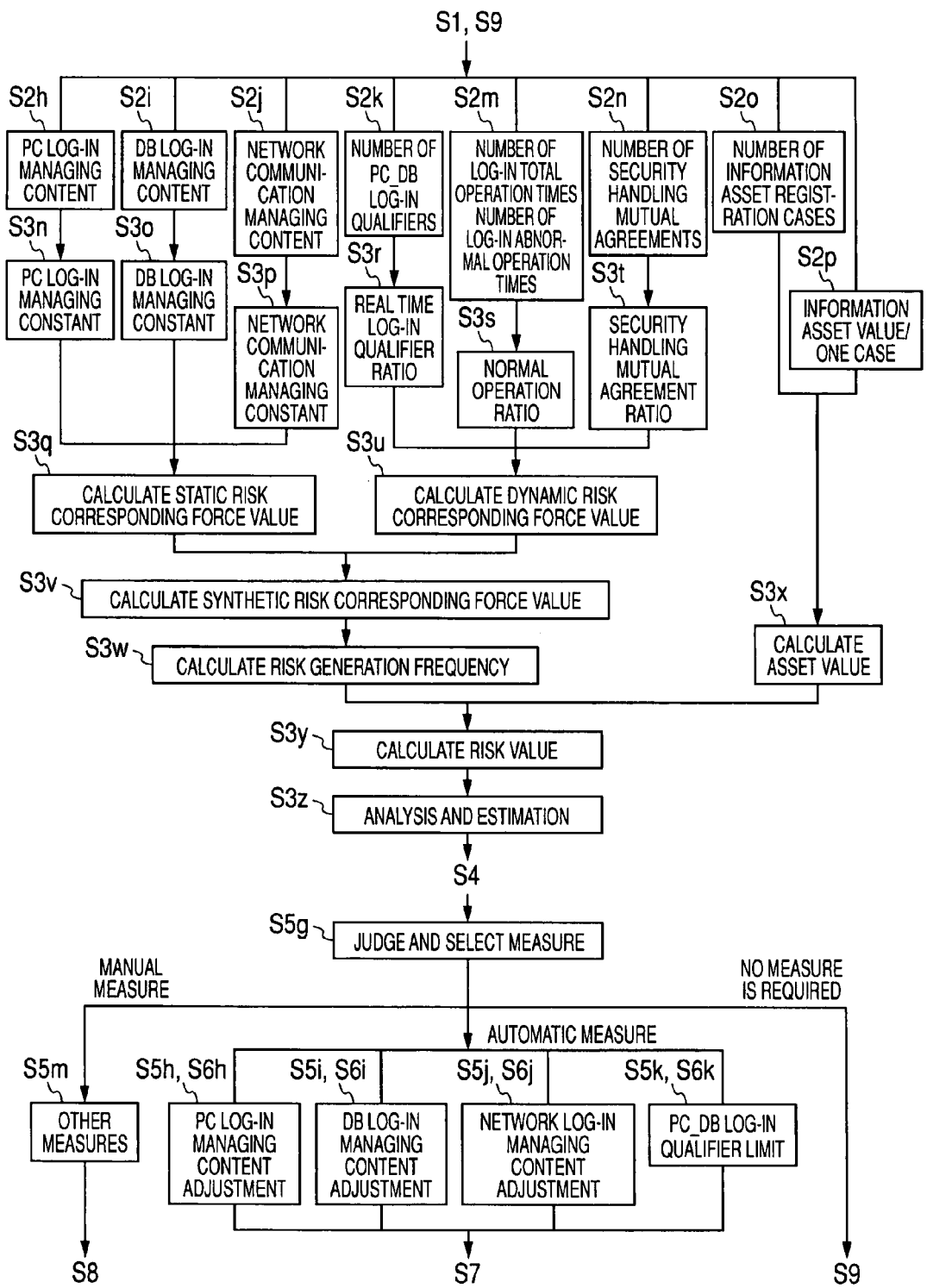
FIG. 18 is a flow chart showing a detailed procedure of one portion of security monitoring processing of the fourth embodiment.

FIG. 18 is a flow chart showing a detailed procedure of security monitoring processing of a fourth embodiment. This flow chart shows details of partial processing in the flow chart of FIG. 2. Namely, steps S2*h* to S2*p* of FIG. 18 show details of step S2 of FIG. 2. Steps S3*n* to S3*z* of FIG. 18 show details of step S3 of FIG. 2. Steps S5*g* to S5*m* and S6*h* to S6*k* of FIG. 18 show details of steps S5 and S6 of FIG. 2. Steps S1, S4, S7, S8, S9 of FIG. 18 are respectively equal to steps of the same reference numerals of FIG. 2.

A user starts security monitoring AP 16*a* in the security monitoring device 1, and inputs a monitoring condition by the operation section 13 to monitor security of information asset A2 located within DB 82*b* able to be logged in and accessed from PC 81*b* of FIG. 17. Here, "information asset A2" is inputted as an asset, and "PC 81*b*" is inputted as a security device, and e.g., "information leakage" is inputted as a kind of risk. In addition to this, for example, the security division may be also inputted as "all accessible PC". When the monitoring condition is inputted, the control section 11 sets the input information as the monitoring condition (step S1 of FIG. 2). Security information and asset information from the security devices 2, 3 are monitored and collected in real time on the basis of the monitoring condition (step S2). More particularly, the information about that information asset A2 is stored into DB 82*b* of the server 82, and information about the asset value per one case (per unit quantity) of information asset A2 are registered to asset DB 26*b* of the security managing device 2. Therefore, the control section 11 monitors that the information about a storing position of information asset A2 and the asset value per unit quantity is transmitted from the security managing device 2, and collects this information (step S2*p* of FIG. 18). Further, the control section 11 monitors that the information about the number of cases of information asset A2 registered to DB 82*b* is transmitted from the server 82 through the security managing device 2, and collects this information (step S2*o*). Further, information about the number of log-in qualifiers to DB 82*b*, the number of log-in qualifiers from PC 81*b* to DB 82*b*, and the number of security handling mutual agreements within the log-in qualifiers is respectively registered to individual ID DB 26*d* and policy DB 26*f* of the security managing device 2. Therefore, the control section 11 monitors that information about the number of above log-in qualifiers and the number of security handling mutual agreements is transmitted from the security managing device 2, and collects this information (steps S2*k*, S2*n*). Further, log-in managing contents (i.e., an authenticating method of the access qualifier at a log-in time) of PC 81*b* and DB 82*b*, and information showing communication managing contents in a network connecting PC 81*b* and server 82 are registered to policy DB 26*f* of the security managing device 2. Therefore, the control section 11 monitors that the present above log-in managing contents and the information showing the communication managing contents in the network are transmitted from the security managing device 2, and collects the information (steps S2*h*, S2*i*, S2*j*). Further, information about the number of total log-in operation times and the number of abnormal log-in operation times logged in PC 81*b* and DB 82*b* from this PC 81*b* until the present time is recorded to access log 81*a* of PC 81*b*. Therefore, the control section 11 monitors that the information about the number of above total log-in operation times and number of abnormal log-in operation times until the present time is transmitted from PC 81*b* through the security managing device 2, and collects the information (step S2*m*).

Next, the control section 11 analyzes and estimates the security risk change on the basis of the above monitored and collected security information and asset information, and information stored to security monitoring DB 16*b* (step S3 of FIG. 2). As mentioned above, both the log-in managing contents to the present PC 81*b* and DB 82*b* are "collation of a user name and a password", and the communication managing contents in the present network are "encryption of communication data". Therefore, the control section 11 respectively reads-out managing constant "0.95" corresponding to "collation of a user name and a password" of the log-in managing contents to the present PC 81*b* and DB 82*b*, and managing constant "0.95" corresponding to "encryption of communication data" of the communication managing contents in the present network from the security managing constant table of FIG. 6 (steps S3*n*, S3*o*, S3*p* of FIG. 18). The control section 11 then calculates the static risk corresponding force value from PC 81*b* to DB 82*b* as follows from the managing constants (step S3*q*).

(Static risk corresponding force from PC 81*b* to DB 82*b*)=(static risk corresponding force value of PC 81*b*)×(static risk corresponding force value of DB 82*b*)×(static risk corresponding force value of network)=(log-in managing constant to PC 81*b*)×(log-in managing constant to DB 82*b*)× (managing constant using encryption of network) =0.95×0.95×0.95=0.86

Further, the control section 11 respectively calculates a log-in qualifier ratio from PC 81*b* to DB 82*b*, a log-in normal operation ratio in PC 81*b*, and a security handling mutual agreement ratio within the log-in qualifiers as follows from the number of log-in qualifiers to DB 82*b*, the number of log-in qualifiers from PC 81*b* to DB 82*b*, the number of total log-in operation times to PC 81*b* and DB 82*b* from this PC 81*b*, the number of abnormal log-in operation times and the number of security handling mutual agreements of the log-in qualifier (steps S3*r*, S3*s*, S3*t*). The control section 11 further calculates the dynamic risk corresponding force value from PC 81*b* to DB 82*b* from these ratios as follows (step S3*u*).

(Log-in qualifier ratio from PC 81*b* to DB 82*b*)= (number of log-in qualifiers from PC 81*b* to DB 82*b*)/(number of log-in qualifiers to DB 82*b*)=2/ 50=0.04

(Log-in normal operation ratio in PC 81*b*)=(number of total log-in operation times−number of abnormal log-in operation times)/(number of total log-in operation times)=(100−0.1)/100=0.999

(Security handling mutual agreement ratio within log-in qualifiers from PC 81*b* to DB 82*b*)=(number of security handling mutual agreements within log-in qualifiers from PC 81*b* to DB 82*b*)/(number of log-in qualifiers from PC 81*b* to DB 82*b*) =2/2=1.0

(Dynamic risk corresponding force from PC 81*b* to DB 82*b*)=(origin of morals of organization)+ (number of remaining origin of morals of organization)×(1−log-in qualifier ratio from PC 81*b* to DB 82*b*)×(log-in normal operation ratio in PC 81*b*)×(security handling mutual agreement ratio within log-in qualifiers from PC 81*b* to DB 82*b*) =0.1+0.9×(1−0.04)×0.999×1.0=0.96

Further, the control section 11 calculates the synthetic risk corresponding force value from PC 81*b* to DB 82*b* as follows from the above static risk corresponding force value and dynamic risk corresponding force value (step S3*v*). Further, the control section 11 calculates the occurrence frequency of risk of information leakage of information asset A2 of DB 82*b* accessible from PC 81*b* as follows from these values (step S3*w*).

(Synthetic risk corresponding force value from PC 81b to DB 82b)=(static risk corresponding force value from PC 81b to DB 82b)×(dynamic risk corresponding force value from PC 81b to DB 82b)=0.86×0.96=0.83

(Occurrence frequency of risk of information leakage of information asset A2 of DB 82b accessible from PC 81b)=1−(synthetic risk corresponding force value from PC 81b to DB 82b)=1−0.83=0.17

Further, the control section 11 calculates the asset value of information asset A2 as follows from the number of registration cases of information asset A2 and the asset value per unit quantity (step S3x).

(Asset value of information asset A2)=(number of registration cases of information asset A2)×(asset value per unit quantity of information asset A2)= (e.g., ten thousand cases)×(e.g., ten thousand yen)=one hundred million yen Further, the control section 11 calculates the risk value of information leakage of information asset A2 of DB 82b accessible from PC 81b as follows from the above occurrence frequency of risk and the asset value of information asset A2 (step S3y).

(Risk value of information leakage of information asset A2 of DB 82b accessible from PC 81b)= (occurrence frequency of risk of information leakage of information asset A2 of DB 82b accessible from PC 81b)×(asset value of information asset A2)=0.17×one hundred million yen=17,000 thousand yen When the calculation is made as mentioned above, the control section 11 records each of the above calculating values to the security risk log 16c as the present calculating value together with a calculating date. Further, the control section 11 compares the present calculating value with an allowance value set in advance, and makes an analysis. The control section 11 also pursues values from the past calculating value to the present calculating value in time series, and analyzes a change tendency, and estimates a transition of the future. Thus, the control section 11 forms and outputs the analyzed and estimated results as a graph (step S4 of FIG. 2). The static risk corresponding force value, the dynamic risk corresponding force value, the synthetic risk corresponding force value, the occurrence frequency of risk and the risk value are analyzed, estimated and formed as graphs similarly to those explained in FIGS. 7 to 12. Further, the asset value may be also formed and outputted as a graph in time series. In this case, an increase-decrease state of information asset A2 can be accurately recognized in real time. Here, the illustrated explanation is omitted.

When the results of analyses and estimation are outputted as mentioned above, the control section 11 judges and selects a measure on the basis of the results of analyses and estimation and information stored to the security monitoring DB 16b (step S5 of FIG. 2 and step S5g of FIG. 18). For example, when each of the static risk corresponding force value, the dynamic risk corresponding force value and the synthetic risk corresponding force value is an allowance value or more and each of the occurrence frequency of risk and the risk value is an allowance value or less, the control section 11 judges that no measure for changing the security strength from PC 81b to information asset A2 of DB 82b is required. In contrast to this, when one of the static risk corresponding force value, the dynamic risk corresponding force value and the synthetic risk corresponding force value is smaller than the allowance value or is estimated so as to soon become smaller than the allowance value, or one of the occurrence frequency of risk and the risk value is greater than the allowance value or is estimated so as to soon become greater than the allowance value, the control section 11 judges that the measure for changing the security strength from PC 81b to information asset A2 of DB 82b is required. The control section 11 then retrieves security monitoring DB 16b of FIG. 14, and selects the measure.

The control section 11 extracts an executable measure from a security measure candidate table so as to raise the security strength from PC 81b to information asset A2 of DB 82b, and specifically sets the measure so as to be conformed to a security situation from PC 81b to information asset A2 of DB 82b. For example, a log-in managing content adjustment to PC 81b and DB 82b (steps S5h, S5i of FIG. 18), a communication managing content adjustment in a network (step S5j), and a log-in qualifier limit from PC 81b to DB 82b (step S5k) are respectively set as an automatic measure. Other measures enumerated in the security measure candidate table are set as a manual measure (step S5m). For example, the control section 11 then selects one or plural measures of steps S5h to S5m in accordance with the magnitude of a difference between the above calculating value and the allowance value.

When the log-in managing content adjustment (steps S5h, S5i) to PC 81b and DB 82b of the automatic measure is selected, the control section 11 controls the operations of PC 81b and DB 82b through the security managing device 2 so as to change the log-in managing contents to PC 81b and DB 82b from "collation of a user name and a password" set at present to e.g., stricter "collation of user ID and a password" (steps S6h, S6i). For example, the user ID is inputted to PC 81b by reading ID recorded to an IC card possessed by an individual by a card reader, etc. connected to PC 81b, etc. Further, when the communication managing content adjustment (step S5j) in the network is selected, the control section 11 controls the operations of PC 81b and DB 82b through the security managing device 2 so as to change e.g., an encryption system set at present to a stricter another encryption system (step S6j). Further, when the log-in qualifier limit (step S5k) from PC 81b to DB 82b is selected, the control section 11 controls the operations of the security managing device 2, PC 81b and DB 82b so as to more strictly limit and reduce the log-in qualifier from PC 81b to DB 82b (step S6k). When the automatic measure is executed as mentioned above, the control section 11 displays the execution of the above automatic measure in the display section 12, etc. and notifies this execution. The control section 11 then records the contents of the measure and an executing date to the security setting log 16d (step S7 of FIG. 2).

Further, when the manual measure and other measures (step S5m of FIG. 18) are selected, the control section 11 displays that this measure should be executed in the display section 12, etc., and notifies this execution. The control section 11 also records the contents of the measure and the notifying date to the security setting log 16d (step S8 of FIG. 2). If the control section 11 then judges that, e.g., monitoring of security is terminated as mentioned above in step S9 of FIG. 2 (step S9: YES), processing is terminated. In contrast to this, if the control section 11 judges that no monitoring is terminated (step S9: NO), it proceeds to step S2 and subsequent processing is continued.

In accordance with the above description, in the security monitoring device 1, information from the security devices 2, 3 is automatically monitored and collected in real time, and the static risk corresponding force value, the dynamic risk corresponding force value, the synthetic risk corresponding force value, the asset value, the occurrence frequency of risk and the risk value can be accurately calculated on the basis of this information. Since a changing state of each value is analyzed and estimated and a result is outputted, the output result can be set so as to be further conformed to reality. Therefore, the states of security and risk during a daily business operation are further accurately recognized from the above output result, and an appropriate measure can be taken.

FIG. 19 is a view showing a security situation of a fifth embodiment. The security situation of the room R is similar to the security situation of the first embodiment shown in FIG. 4. PC 81*b* of the fourth embodiment shown in FIG. 17 is arranged within the room R. The security situation of information asset A2 of DB 82*b* of server 82 (FIG. 1) accessible from PC 81*b* is similar to the security situation of the fourth embodiment. When the security of information asset A2 of DB 82*b* accessible from PC 81*b* located within the room R is monitored, the states of security and risk of PC 81*b* seen from the room R and the states of security and risk of information asset A2 of DB 82*b* seen from PC 81*b* are considered. Namely, the security division of a monitoring object is formed in two hierarchical layers, and an outside division is the room R, and an inside division ranges from PC 81*b* to DB 82*b*. In this case, the control section 11 of the security monitoring device 1 of FIG. 1 monitors and collects security information from the security devices 2, 3 arranged and introduced in the room R, security information from the security devices 2, 3 for getting access to information asset A2 from PC 81*b*, and asset information on information asset A2 in real time. The control section 11 then calculates the synthetic risk corresponding force value of the room R and the synthetic risk corresponding force value from PC 81*b* to DB 82*b* on the basis of the monitored and collected security information, asset information, etc. Further, the control section 11 calculates the risk corresponding force value of information asset A2 in the room R, i.e., the synthetic risk corresponding force value of the entire security division hierarchically formed on the basis of each synthetic risk corresponding force value.

Specifically, the control section 11 calculates the risk corresponding force value of information asset A2 in the room R as follows. Each risk corresponding force value of the room R quotes a value calculated in the first embodiment, and each risk corresponding force value from PC 81*b* to DB 82*b* quotes a value calculated in the fourth embodiment.

(Static risk corresponding force value of room R)=0.77

(Dynamic risk corresponding force value of room R)=0.85

(Synthetic risk corresponding force value of room R)=0.65

(Static risk corresponding force value from PC 81*b* to DB 82*b*)=0.86

(Dynamic risk corresponding force value from PC 81*b* to DB 82*b*)=0.96

(Synthetic risk corresponding force value from PC 81*b* to DB 82*b*)=0.83

(Risk corresponding force value of information asset A2 in room R)=(synthetic risk corresponding force value of outside division R)+((1−synthetic risk corresponding force value of outside division R)×synthetic risk corresponding force value from PC 81*b* to DB 82*b* of inside division)=0.65+((1−0.65)×0.83)=0.94

It is understood from the above description that the synthetic risk corresponding force value of the room R is "0.65", and the synthetic risk corresponding force value from PC 81*b* to DB 82*b* is "0.83", but, in contrast to this, the risk corresponding force value of information asset A2 in the room R is "0.94" and becomes high.

As mentioned above, when the risk corresponding force value of information asset A2 located in the security division hierarchically formed by the room R, PC 81*b*, etc. is calculated, the occurrence frequency of risk and the risk value of information leakage of information asset A2 in the entire security division hierarchically formed can be more accurately calculated and outputted from the risk corresponding force value. Further, each layer of the security division hierarchically formed, the entire risk corresponding force value and the state of risk are accurately and quantitatively recognized, and an appropriate measure required every each layer or as a whole can be judged and taken.

In the present invention, various modes can be adopted in addition to the above embodiment modes. For example, in the above embodiment modes, the static risk corresponding force value, the dynamic risk corresponding force value, the synthetic risk corresponding force value, the occurrence frequency of risk, the asset value and the risk value are respectively calculated and outputted. However, one or two or more of these values, etc. may be also suitably selected and calculated and outputted.

Further, in the above embodiment modes, object asset A1 and information asset A2 are enumerated in an example as assets to be protected. However, in addition to these, for example, a person such as an employee is set to assets and risk of a disaster, an accident, etc. giving damage to a person, and security of equipment, a system, etc. for protecting a person may be also monitored.

Further, in the above embodiment modes, the rooms R, Ra, Rb are enumerated in an example as the security division. However, in addition to this, for example, an entire building is set as the security division, and security of all assets, etc. located within the division may be also monitored.

Further, in the above embodiment modes, one PC 81*b* is enumerated in an example as an access source to information asset A2. However, in addition to this, plural PCs, etc. may be also set to the access source to the information asset. In this case, for example, it is preferable that security relating to access to the information asset from each PC is always monitored, and security relating to the access to the information asset from PC most inferior in risk corresponding force value, etc. among these PCs is always monitored.

What is claimed is:

1. A security monitoring device connected to a security device and monitoring security, and comprising:
    monitoring-collecting means for monitoring and collecting information from the security device in real time;
    analyzing-estimating means for analyzing and estimating a security risk change on the basis of the information monitored and collected by said monitoring-collecting means;
    output means for outputting a result analyzed and estimated by said analyzing-estimating means;
    a security managing constant table; and
    control means for controlling security strength on the basis of the result analyzed and estimated by said analyzing-estimating means, wherein said control means changes a setting parameter of said security device and judges and selects a measuring means.

2. The security monitoring device according to claim 1, wherein said control means changes access qualification with respect to said security device.

3. The security monitoring device according to claim 1, wherein said control means changes a security division.

4. The security monitoring device according to claim 1, wherein said monitoring-collecting means monitors and collects a setting state of said security device and the number of access times with respect to said security device, and said analyzing-estimating means analyzes and estimates the security risk change on the basis of said setting state and said number of access times.

5. The security monitoring device according to claim 4, wherein said analyzing-estimating means calculates static risk corresponding force on the basis of said setting state, and calculates dynamic risk corresponding force on the basis of said number of access times, and calculates synthetic risk corresponding force on the basis of the static risk corresponding force and the dynamic risk corresponding force, and calculates occurrence frequency of risk on the basis of the synthetic risk corresponding force.

6. The security monitoring device according to claim 1, wherein said analyzing-estimating means analyzes and estimates the security risk change on the basis of the information monitored and collected by said monitoring-collecting means, and an acquired asset value.

7. The security monitoring device according to claim 6, wherein said analyzing-estimating means calculates the asset value in real time on the basis of acquired asset quantity and the asset value per unit quantity.

8. The security monitoring device according to claim 7, wherein said monitoring-collecting means monitors and collects reading information from the security device for reading an identifier attached to an asset in real time, and said analyzing-estimating means detects the asset quantity in real time on the basis of said reading information monitored and collected by said monitoring-collecting means.

9. The security monitoring device according to claim 1, wherein, when the security division of a monitoring object is hierarchically formed, said monitoring-collecting means monitors and collects information from the security device located in each layer in real time, and said analyzing-estimating means calculates risk corresponding force every each layer on the basis of the information monitored and collected by said monitoring-collecting means, and also calculates the risk corresponding force of said entire security division on the basis of each risk corresponding force.

10. A security monitoring system constructed by a security device, and a security monitoring device connected to the security device and monitoring security, wherein said security device transmits set information or detected information to said security monitoring device, and said security monitoring device monitors and collects information from said security device in real time, analyzes and estimates a security risk change on the basis of this information, outputs the analyzed and estimated results, controls security strength on the basis of the results analyzed and estimated, changes a setting parameter of said security device, and judges and selects a measuring means.

11. A security monitoring method for monitoring security relating to a security device, wherein information from the security device is monitored and collected in real time, a security risk change is analyzed and estimated on the basis of this information, the analyzed and estimated results are outputted, security strength is controlled on the basis of the results analyzed and estimated, a setting parameter of said security device is changed, and a measuring means is selected.

* * * * *